US008540166B2

(12) United States Patent
Nemoto et al.

(10) Patent No.: US 8,540,166 B2
(45) Date of Patent: Sep. 24, 2013

(54) VEHICULAR AIR-CONDITIONING SYSTEM AND CONTROL METHOD OF SAME

(75) Inventors: Atsuki Nemoto, Toyota (JP); Kiwamu Inui, Toyota (JP); Masaki Morita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1125 days.

(21) Appl. No.: 12/519,579

(22) PCT Filed: Dec. 7, 2007

(86) PCT No.: PCT/IB2007/004240
§ 371 (c)(1),
(2), (4) Date: Jun. 17, 2009

(87) PCT Pub. No.: WO2008/078186
PCT Pub. Date: Jul. 3, 2008

(65) Prior Publication Data
US 2009/0314847 A1 Dec. 24, 2009

(30) Foreign Application Priority Data

Dec. 26, 2006 (JP) .................................. 2006-349518

(51) Int. Cl.
*B60H 1/00* (2006.01)
(52) U.S. Cl.
USPC ........... 237/12.3 A; 237/5; 454/121; 454/143; 123/41.11; 123/41.12; 701/36
(58) Field of Classification Search
USPC ................... 237/5, 12.3 A, 12.3 B; 454/143, 454/121; 123/41.11, 41.12; 701/36
See application file for complete search history.

(56) References Cited

U.S. PATENT DOCUMENTS 3,008,694 A * 11/1961 Todd ................................. 237/5
5,012,859 A * 5/1991 Nakazawa et al. ....... 237/12.3 A
(Continued)

FOREIGN PATENT DOCUMENTS

JP 57198313 A * 12/1982
JP 59-145617 8/1984
(Continued)

OTHER PUBLICATIONS

Ikeda, et al, JP7032852A English machine translation, Feb. 3, 1995.*

(Continued)

*Primary Examiner* — Kang Hu
*Assistant Examiner* — Phillip E Decker
(74) *Attorney, Agent, or Firm* — Finnegan, Henderson, Farabow, Garrett & Dunner, LLP

(57) ABSTRACT

An air-conditioner ECU sets the maximum flowrate or a set flowrate which is less than the maximum flowrate as a required flowrate Vr based on outside air temperature when a DEF mode is selected, and requires that coolant be circulated (steps 100 to 110). Also, when the coolant temperature Tw during heating is between a set temperature $T_{S3}$ and a set temperature $T_{S1}$, circulation of coolant at the minimum flowrate is required (steps 134, 130, 132). When a blower fan is stopped when the coolant temperature is equal to or less than the set temperature $T_{S3}$ and a fresh air mode is selected, the circulation of coolant at the minimum flowrate is required when the vehicle speed Sv is above a set vehicle speed (steps 134 to 146). Cool air is prevented from being blown out of an air outlet and heating of the coolant is promoted by suppressing the speed of an electric pump while maintaining the ability to prevent fogging.

7 Claims, 9 Drawing Sheets

(56) References Cited

U.S. PATENT DOCUMENTS

| | | | |
|---|---|---|---|
| 5,307,644 A * | 5/1994 | Cummins et al. | 123/41.12 |
| 5,427,313 A * | 6/1995 | Davis et al. | 236/49.3 |
| 5,560,217 A * | 10/1996 | Takahashi et al. | 62/200 |
| 5,570,838 A * | 11/1996 | Davis et al. | 454/258 |
| 5,653,386 A * | 8/1997 | Hennessee et al. | 237/12.3 B |
| 5,699,960 A * | 12/1997 | Kato et al. | 237/12.3 A |
| 5,725,048 A * | 3/1998 | Burk et al. | 237/12.3 A |
| 5,937,940 A * | 8/1999 | Davis et al. | 706/52 |
| 5,971,290 A * | 10/1999 | Echigoya et al. | 237/12.3 A |
| 6,341,643 B1 * | 1/2002 | Osakabe | 454/121 |
| 6,374,780 B1 * | 4/2002 | Rutyna et al. | 123/41.12 |
| 6,591,174 B2 * | 7/2003 | Chung et al. | 701/36 |
| 6,668,766 B1 * | 12/2003 | Vint et al. | 123/41.44 |
| 6,802,283 B2 * | 10/2004 | Liederman et al. | 123/41.12 |
| 2006/0196634 A1 | 9/2006 | Sato et al. | |
| 2006/0288967 A1 * | 12/2006 | Joyce et al. | 123/41.08 |

FOREIGN PATENT DOCUMENTS

| | | |
|---|---|---|
| JP | 1-107610 | 7/1989 |
| JP | 6-72132 | 3/1994 |
| JP | 7-32852 | 2/1995 |
| JP | 10-18845 | 1/1998 |
| JP | 2003-34126 | 2/2003 |
| JP | 2004-360509 | 12/2004 |
| JP | 2005-163545 | 6/2005 |

OTHER PUBLICATIONS

Takada, JP2003034126A English machine translation, Feb. 4, 2003.*

Morita, JP2004360509A English machine translation, Dec. 24, 2004.*

Morita, JP 2004-360509 A English machine translation, Dec. 24, 2004.*

"Notification Concerning Rejection REASON" in Japanese Patent Application No. 2006-349518, filed Dec. 26, 2006 (Drafting date: Sep. 10, 2008).

* cited by examiner

ENGINE COOLANT TEMPERATURE Tw

VEHICLE SPEED Sv

VEHICULAR AIR-CONDITIONING SYSTEM AND CONTROL METHOD OF SAME

CROSS-REFERENCE TO RELATED APPLICATIONS

This application is a national phase application of International Application No. PCT/IB2007/004240, filed Dec. 7, 2007, and claims the priority of Japanese Application No. 2006-349518, filed Dec. 26, 2006, the contents of both of which are incorporated herein by reference.

BACKGROUND OF THE INVENTION

1. Field of the Invention

The invention relates to a vehicular air-conditioning system which produces a flow of supply air the temperature of which has been adjusted using coolant of an internal combustion engine, and a control method of that vehicular air-conditioning system.

2. Description of the Related Art

In an air-conditioning system (hereinafter simply referred to as "air-conditioner") provided in a vehicle having an internal combustion engine (hereinafter simply referred to as "engine") as a driving source for running, supply air is heated using engine coolant that is circulated between a heater core provided as a heat exchanger for heating, and the engine. This engine coolant is circulated between the engine, an engine radiator, and the heater core by a water pump which is driven by the driving force of the engine.

Vehicles in which engine stop control is performed, which stops the engine when a preset engine stop condition such as idling stop is satisfied in an attempt to conserve energy and reduce emissions (hereinafter this control will simply be referred to as "eco-run control"), use an electric pump which is driven by an electric motor to enable engine coolant to still be circulated even when the engine is stopped.

A hybrid vehicle that is provided with an electric motor as well as an engine as a driving source for running is one such vehicle in which eco-run control is performed. These hybrid vehicles aim to improve fuel efficiency and reduce emissions by stopping the engine not only when the vehicle is stopped but also while the vehicle is running.

However, even in a vehicle in which eco-run control is performed, when the temperatures of the engine and the engine coolant are low at engine startup, the engine is first warmed up to a temperature at which it is able to run efficiently.

With an air-conditioner, if the temperature of the engine coolant is low as is the case when the engine is warming up, for example, the desired heating ability is unable to be obtained. If the heating ability is insufficient, low temperature (i.e., cool) air is blown out which may by unpleasant for occupants. Also, if the vehicle cabin starts to be heated using engine coolant while the engine is warming up, the engine coolant may end up being cooled by the heater core, thus lengthening the time that it takes for the engine to warm up.

This resulted in a proposal for technology to promote engine warm-up by suppressing the circulation of coolant when warming up the internal combustion engine.

For example, technology described in Japanese Patent Application Publication No. 10-18845 (JP-A-10-18845) aims to shorten engine warm-up time and enable heating to start earlier by reducing the flowrate of coolant that is circulated in the coolant circuit when the coolant temperature is equal to or less than a predetermined temperature.

Also, technology described in Japanese Patent Application Publication No. 6-72132 (JP-A-6-72132) stops blowing air until the temperature of the engine coolant has reached a set temperature selected according to the outside air temperature to prevent cool air from being blown out.

Meanwhile, in a vehicle that is running, the volume of supply air that is blown into the vehicle cabin changes according to the pressure (i.e., ram pressure) against the front of the vehicle, which may be unpleasant for the occupants. This resulted in a proposal of technology to correct the target supply air temperature based on the running speed of the vehicle and the ratio of outside air being introduced, which is described in Japanese Utility Model Application Publication No. 1-107610 (JP-U-1-107610).

In order to conserve energy when eco-run control is performed, it is necessary to increase the period of time for which the engine is stopped (i.e., the engine stop time), and inhibit the engine from being repeatedly stopped and restarted frequently. Further, even more energy can be saved by reducing the amount the electric pump is driven which reduces power consumption.

However, when the engine has been stopped for an extended period of time such that the temperature of the engine coolant drops and the electric pump is stopped, the heating ability of the air-conditioner also diminishes. Therefore, Japanese Patent Application Publication No. 2005-163545 (JP-A-2005-163545) proposes technology to start the engine when the temperature of the engine coolant drops, and stop the engine and drive the electric pump when the temperature of the engine coolant rises above a predetermined temperature.

However, air may be end up being blown from an air outlet due to the ram pressure while the vehicle is moving, even if a blower fan of the air-conditioner is not being driven when the electric pump is stopped while the vehicle is running. Even if the target supply air temperature is adjusted according to the vehicle running speed to prevent this from happening, cool air may still end up being blown out if the temperature of the coolant is low and the heating ability is insufficient.

SUMMARY OF THE INVENTION

This invention provides a vehicular air-conditioning system which prevents an unpleasant sensation from being imparted to an occupant due to the temperature of engine coolant which serves as the heat source during heating being low, while conserving energy by appropriately controlling operation of an electric pump.

A first aspect of the invention relates to an air-conditioning system provided for a vehicle that includes an electric pump that circulates coolant at a flowrate according to a speed of the electric pump between an engine and a heater core, and drive controlling means for controlling starting/stopping of the electric pump, as well as the speed of the electric pump when the electric pump is being driven, based on a driving state of the engine, and driving the electric pump at a speed according to a required flowrate that is input when a flowrate is required. The air-conditioning system performs air-conditioning by blowing supply air, which is produced by controlling an air-heating amount by the heater core through which the coolant is circulated, out into a vehicle cabin from an air outlet. This air-conditioning system includes: a blower fan that is driven to produce the supply air; coolant temperature detecting means for detecting a temperature of the coolant; air-conditioning controlling means for air-conditioning the vehicle cabin with supply air produced by controlling the amount of air heated by the heater core, by controlling operation of the blower fan, and stopping operation of the blower fan when the temperature of the coolant detected by the coolant temperature detecting means is equal to or less than a set temperature during heating; vehicle speed detecting means for detecting a vehicle speed; requirement setting means for setting the required flowrate of the coolant that is circulated to the heater core based on the vehicle speed detected by the vehicle speed detecting means when the blower fan is stopped by the air-conditioning controlling means because the temperature of the coolant has not reached the set temperature; and requiring means for requiring the drive controlling means to circulate the coolant of the required flowrate when the required flowrate has been set by the requirement setting means.

The vehicular air-conditioning system according to this aspect air-conditions the vehicle cabin with supply air produced by controlling the amount of air that passes through the heater core using an air mixing damper. Also, the drive controlling means controls the starting/stopping of the electric pump, as well as the speed at which the electric pump is driven, based on the driving state, such as whether the engine is operating or stopped, the speed at which the engine is operating, and the temperature of the coolant.

Here, the air-conditioning controlling means aims to conserve energy while preventing cool air from being blown out into the vehicle cabin by stopping the blower fan when the coolant temperature falls below a set temperature.

At this time, the setting means sets a required flowrate when the vehicle speed exceeds a preset speed, for example. Then the electric pump is driven and coolant is circulated based on this required flowrate.

As a result, for example, even if the vehicle speed is high and air that hits the front of the vehicle as it moves is blown from the outlet due to the ram pressure (this air is referred to as "ram air"), that air is heated by coolant that is circulated through the heater core so that it will be more pleasant for the occupant.

Also, the vehicular air-conditioning system may include switching means for switching between an outside air inlet through which air outside the vehicle is introduced as the supply air, and an inside air inlet through which air inside the vehicle cabin is introduced as the supply air. Further, the requirement setting means may set the required airflow when the switching means makes a switch such that outside air is introduced through the outside air inlet.

According to this structure, when the outside air inlet is open, coolant is circulated by driving the electric pump, which reduces the extent to which the electric pump is driven. When the outside air inlet is open, outside air (i.e., ram air) is blown from the outlet due to the ram pressure. So, by driving the electric pump only at this time, the energy can be conserved.

Also, when the switching means makes a switch such that outside air is introduced through the outside air inlet, the requirement setting means may set a minimum flowrate within a preset required flowrate settable range as the required flowrate.

Setting the required flowrate to the minimum flowrate in this way keeps the speed of the electric pump down which conserves energy, and also suppresses a drop in coolant temperature while the engine is stopped.

That is, in this aspect of the invention, when the coolant temperature is low, the air-conditioner is set to the engine warm-up promoting mode that promotes engine warm-up and suppresses a drop in coolant temperature. However, when the vehicle speed is high and the air-conditioner is in this engine warm-up promoting mode, at least the electric pump is driven to reduce an unpleasant sensation from being imparted to the occupant. Also, by suppressing the required flowrate, the power consumption and the like is also able to be reduced.

The vehicular air-conditioning system may also include selecting means for selecting, as an outlet for the supply air, a defroster outlet that points toward a window; and outside air temperature detecting means for detecting an outside air temperature. Further, when the defroster outlet is selected by the selecting means, the air-conditioning controlling means may perform control such the supply air, which is produced by increasing the amount of air that passes through the heater core, is blown out from the defroster outlet. Also, when the defroster outlet is selected by the selecting means and the outside air temperature detected by the outside air temperature detecting means is lower than a set temperature, the requirement setting means may set a maximum flowrate within a preset required flowrate settable range as the required flowrate. Moreover, when the defroster outlet is selected by the selecting means and the outside air temperature is greater than the set temperature, the requirement setting means may set a predetermined flowrate which is lower than the maximum flowrate as the required flowrate.

According to this structure, when the mode to defog/defrost the front windshield and the like is selected, the flowrate of coolant that circulates through the heater core is increased to improve defogging/defrosting ability.

At this time, if the outside air temperature is low, coolant is circulated at the maximum flowrate. If the outside air temperature is relatively high, the required flowrate is reduced and the speed of the electric pump is inhibited from being increased more than necessary, which suppresses an increase in power consumption.

Also, the air-conditioning controlling means may stop the blower fan when the temperature of the coolant is lower than a first set temperature; the air-conditioning means may drive the blower fan when the temperature of the coolant is higher than a second set temperature which is higher than the first set temperature; and the setting means may set the required flowrate when the temperature of the coolant exceeds the first set temperature.

According to this structure, coolant can be circulated by driving the electric pump when the coolant temperature is between the first set temperature and the second set temperature at which the blower fan is stopped. As a result, the heater core can be warmed up by the time the coolant temperature reaches the second set temperature and the blower fan is driven. This makes it possible to prevent cool air from being blown into the vehicle cabin when the blower fan is operated.

That is, it is possible to prevent cool air from being blown into the vehicle cabin when the blower fan is operated by controlling the blower fan so that it starts to be driven after the electric pump starts to be driven.

Also, when the temperature of the coolant exceeds the first set temperature, the setting means may set a minimum flowrate within a preset required flowrate settable range as the required flowrate.

According to this structure, the required flowrate when the blower fan is stopped is set as the minimum flowrate so the speed of the electric pump can be kept down, thereby conserving energy.

That is, in this aspect, the drive mode of the air-conditioning system is set to the engine warm-up promoting mode when the coolant temperature is equal to or less than the first set temperature. When the coolant temperature is between the first set temperature and the second set temperature, the drive mode is set to the low flowrate mode that reduces the required flowrate. Also, when the coolant temperature is equal to or greater than the second set temperature, the drive mode may be set to a required flowrate mode which, for example, sets a required flowrate that keeps the speed of the electric pump down and performs control to obtain the required flowrate that was set. This enables energy to be conserved.

A second aspect of the invention relates to a control method of an air-conditioning system for a vehicle that includes an electric pump that circulates coolant at a flowrate according to a speed of the electric pump between an engine and a heater core, and drive controlling means for controlling starting/stopping of the electric pump, as well as the speed of the electric pump when the electric pump is being driven, based on a driving state of the engine, and driving the electric pump at a speed according to a required flowrate that is input when a flowrate is required. The air-conditioning system performs air-conditioning by blowing supply air, which is produced by controlling an air-heating amount by the heater core through which the coolant is circulated, out into a vehicle cabin from an air outlet. This control method includes detecting a temperature of the coolant; controlling operation of a blower fan that is driven to produce the supply air; air-conditioning the vehicle cabin with supply air produced by controlling the amount of air heated by the heater core; stopping operation of the blower fan when the detected temperature of the coolant is equal to or less than a set temperature during heating; detecting a vehicle speed; setting the required flowrate of the coolant that is circulated to the heater core based on the detected vehicle speed when the blower fan is stopped because the temperature of the coolant has not reached the set temperature; and requiring the drive controlling means to circulate the coolant of the required flowrate when the required flowrate has been set.

Accordingly, for example, even if the vehicle speed is high and air that hits the front of the vehicle as it moves (i.e., ram air) is blown from the outlet due to the ram pressure, that air is heated by coolant that is circulated through the heater core so it will be more pleasant for the occupant.

According to the invention described above, it is possible to prevent an unpleasant sensation from being imparted to the occupant when outside air (i.e., ram air) is blown from an outlet due to the ram pressure while conserving energy when coolant is circulated using the electric pump.

Also, in this invention, it is possible to prevent the speed of the electric pump from being increased more than necessary while ensuring the ability to defog/defrost the front windshield when a defogger/defroster mode for the front windshield is selected.

Furthermore, this invention makes it possible to obtain the exceptional effect of being able to minimize an unpleasant sensation being imparted to the occupant from low temperature supply air being blown out when a blower fan, which was stopped because the coolant temperature was low, is operated because the coolant temperature has increased.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 2:
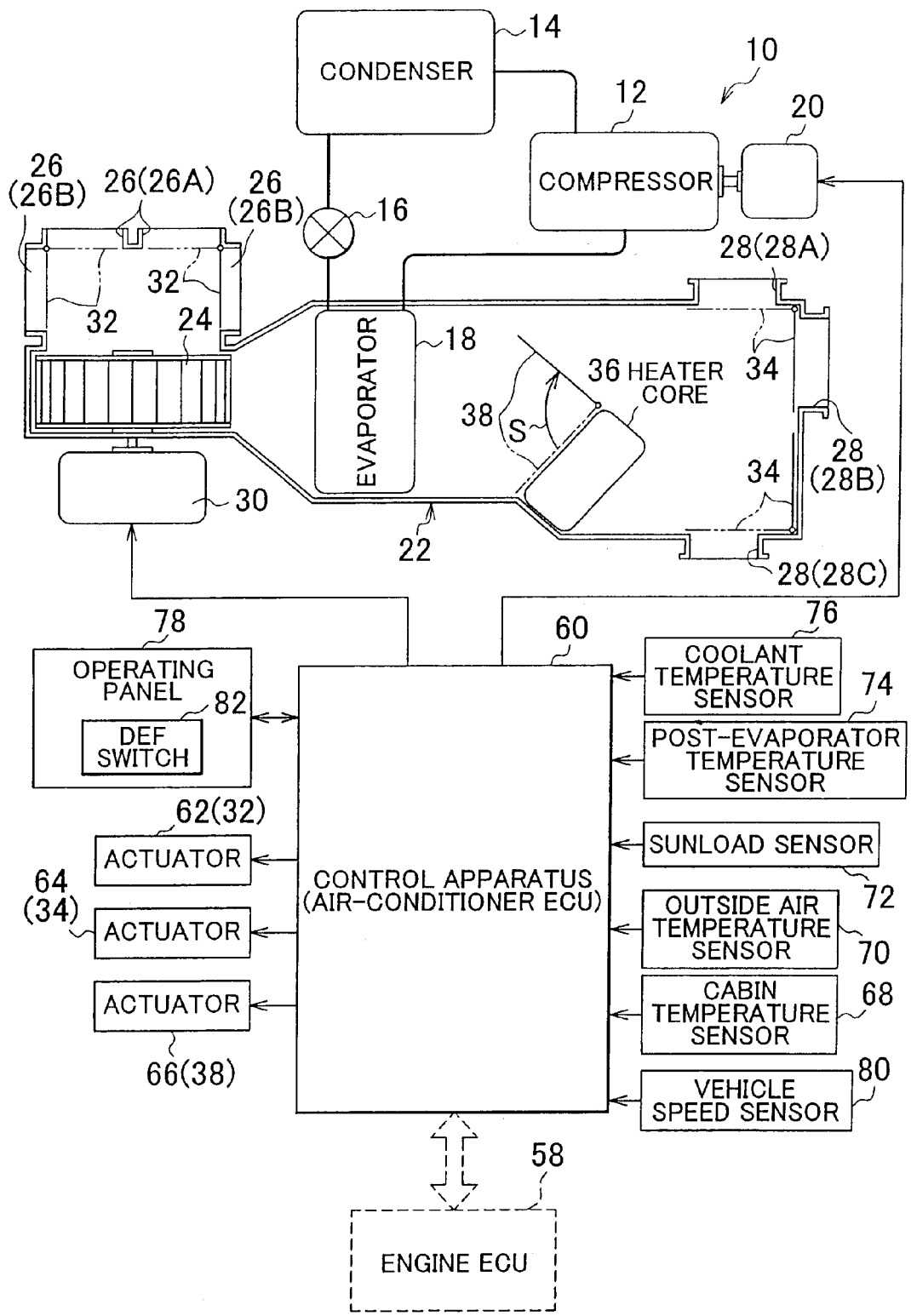
FIG. 2 is a block diagram schematically showing an air-conditioner in the example embodiment.

In the following description and the accompanying drawings, the present invention will be described in more detail in terms of example embodiments. FIG. 2 is a block diagram schematically showing a vehicular air-conditioning system (hereinafter simply referred to as "air-conditioner") 10 in an example embodiment.

In this air-conditioner 10, a refrigeration cycle is created in which refrigerant is circulated by a compressor 12, a condenser 14, an expansion valve 16, and an evaporator 18.

The compressor 12 is driven by a compressor motor 20 so as to compress refrigerant. This high temperature, high pressure refrigerant is then sent to the condenser 14. In the condenser 14, the high temperature, high pressure refrigerant is cooled so that is liquefies. This liquefied refrigerant is then sent to the evaporator 18.

In the evaporator 18, the liquefied refrigerant is vaporized. At this time, air passing through the evaporator 18 is cooled. The expansion valve 16 rapidly reduces the pressure of the liquid refrigerant, and as a result, the refrigerant is nebulized (i.e., atomized) before it is sent to the evaporator 18 to improve the vaporization efficiency of the refrigerant in the evaporator 18.

Meanwhile, the air-conditioner 10 is provided with an air-conditioning unit 22 in which the evaporator 18 is arranged. Also, the air-conditioning unit 22 has a blower fan 24 as well as an air inlet 26 and an air outlet 28.

Air is drawn into the air-conditioning unit 22 through the air inlet 26, passed through the evaporator 18, and blown out into the vehicle cabin as supply air from the air outlet 28 by operating the blower motor 30 and driving the blower fan 24.

The air-conditioning unit 22 has two air introduction modes when producing supply air. One mode is a recirculation mode that draws in air from inside the cabin (i.e., hereinafter this air may also be referred to as "inside air" or "recirculated air"). The other mode is a fresh air mode that draws air from outside the vehicle into the vehicle cabin (hereinafter this air may also be referred to as "outside air" or "fresh air"). The air-conditioning unit 22 has two air inlets 26, i.e., an inside air inlet 26A which is open to the cabin, and an outside air inlet 26B that is open to outside the vehicle. A switching damper 32 is also provided which selectively opens either the inside air inlet 26A or the outside air inlet 26B.

By setting the air introduction mode of the air-conditioner 10, the switching damper 32 is operated according to the air introduction mode that is set such that either fresh air or recirculated air is introduced into the air-conditioning unit 22.

Also in the air-conditioner 10, the air outlet 28 includes three outlets, i.e., a defroster outlet 28A that opens toward the front windshield, not shown, of the vehicle, a dashboard outlet 28B that opens toward occupants in the cabin, and a floor outlet 28C that opens toward the feet of occupants in the front and rear seats. The defroster outlet 28A, the dashboard outlet 28B, and the floor outlet 28C are selectively opened and closed by a mode switching damper 34.

In the air-conditioner 10, there are four air-conditioning modes according to which supply air is blown out, i.e., a DEF mode that blows out supply air from the defroster outlet 28A, a FOOT mode that blows out supply air from the floor outlet 28C, a DEF/FOOT mode that blows out supply air from the defroster outlet 28A and the floor outlet 28C, and a BI-LEVEL mode that blows out supply air from the dashboard outlet 28B and the floor outlet 28C. By setting the air-conditioning mode, the mode switching damper 34 operates according to the air-conditioning mode that is selected.

Meanwhile, the air-conditioner 10 includes a heater core 36 that heats air that will become the supply air, and an air mixing damper 38 that controls the amount of air that passes through the heater core 36. The heater core 36 is arranged downstream of the evaporator 18 in the air-conditioning unit 22, and the air mixing damper 38 is arranged between the evaporator 18 and the heater core 36.

In the air-conditioning unit 22, the air that was heated by passing through the heater core 36 is mixed with air of the temperature that it was when it passed through the evaporator 18 by bypassing the heater core 36. The resultant mixed air is the air to be used for air-conditioning, i.e., the supply air. At this time, the air-conditioner 10 produces supply air of the desired temperature by controlling the amount of air that passes through the heater core 36 and the amount of air that bypasses the heater core 36 according to the opening amount of the air mixing damper 38.

Figure 1:
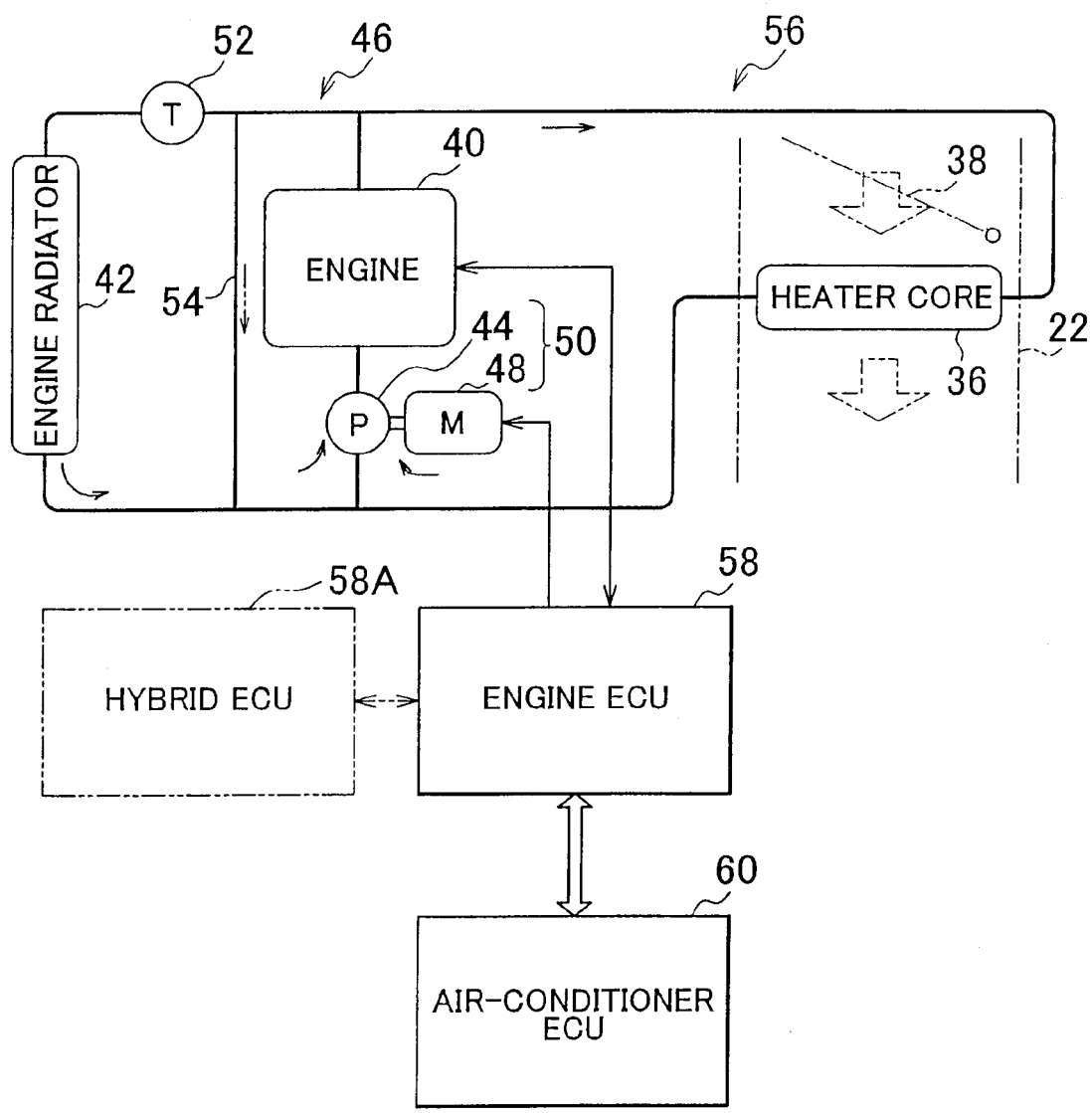
FIG. 1 is a block diagram schematically showing a coolant circulation system according to one example embodiment of the invention.

Meanwhile, as shown in FIG. 1, the vehicle provided with the air-conditioner 10 has an engine 40 which serves as the driving source for running. This engine 40 is an internal combustion engine of a typical configuration in which a water jacket which is formed by a circulation path for engine coolant (hereinafter simply referred to as "coolant") is formed in a cylinder block and a cylinder head (none of which are shown).

The vehicle also has an engine radiator 42, a water pump 44, and a coolant circuit 46 through which coolant circulates between the engine 40 and the engine radiator 42.

Also, the water pump 44 is connected to an electric motor 48. The water pump 44 is an electric pump which is driven by the electric motor 48 (hereinafter, when referred to collectively, the water pump 44 and the electric motor 48 will be referred to as the "electric pump 50"). When the electric pump 50 is operated, it circulates coolant between the engine 40 and the engine radiator 42 such that coolant is cooled in the engine radiator 42, thereby suppressing an increase in the temperature of the engine 40.

A thermostat 52 is provided in the coolant circuit 46 and a bypass passage 54 is formed between the thermostat 52 and the engine 40. When the temperature of the coolant passing through the thermostat 52 is above a predetermined temperature, the thermostat 52 completely opens the coolant flow path to the engine radiator 42 to promote cooling of the coolant in the engine radiator 42. Also, when the coolant temperature falls below the predetermined temperature, the thermostat 52 gradually narrows the flow path to the engine radiator 42 to limit the cooling of the coolant. When the coolant temperature drops even further, the thermostat 52 completely closes off the flow path to stop the coolant from being cooled.

As a result, the temperature of the coolant in the engine 40 is maintained at a set temperature that is higher than the predetermined temperature. Incidentally, in the coolant circuit 46, coolant is circulated via the bypass passage 54 when the thermostat 52 narrows the flow path to the engine radiator 42.

Meanwhile, a circulation passage 56 through which coolant is circulated is formed between the heater core 36 and the engine 40. In this circulation passage 56, the electric pump 50 sends coolant from the engine 40 to the heater core 36. Coolant that has passed through the heater core 36 is then returned to the engine 40 via the electric pump 50.

In the air-conditioner 10, the coolant that is circulated through the heater core 36 serves as the heat source to heat the air (i.e., the supply air) that passes through the heater core 36.

The ratio of the coolant flowrate between the coolant circuit 46 and the circulation circuit 56 is set. Also, the coolant flowrate changes depending on the speed of the electric pump 50 (i.e., the electric motor 48) (that is, depending on the speed of the water pump 44). Accordingly, coolant of a flowrate corresponding to the speed of the electric pump 50 is circulated through the heater core 36.

The vehicle is also provided with an engine ECU 58 that controls the driving of the engine 40. Further, the vehicle provided with the air-conditioner 10 may be a hybrid vehicle provided with an electric motor, not shown, in addition to the engine 40 as the driving source for running. In this case, a hybrid ECU 58A that controls the driving of the electric motor is provided, hence the driving of the engine 40 and the driving of the electric motor are controlled by the engine ECU 58 and the hybrid ECU 58A.

At this time, the engine ECU 58 performs engine stop control that stops the engine 40 when a preset engine stop condition is satisfied, and restarts the engine 40 when an engine restart condition is satisfied while the engine 40 is stopped. A detailed description of this kind of engine stop control will be omitted here.

The electric pump 50 is connected to the engine ECU 58. The engine ECU 58 controls the flowrate of the coolant circulating through the coolant circuit 46 and the circulation circuit 56 by controlling the starting/stopping of the electric pump 50 and the speed of the electric pump 50 while it is being driven.

At this time, the engine ECU 58 controls the starting/stopping and speed of the electric pump 50 according to the driving state of the engine 40 and the coolant temperature. Also, the engine ECU 58 conserves energy by reducing the amount of power consumed by the electric pump 50 by limiting its operation and speed.

As shown in FIG. 2, the compressor motor 20 and the blower motor 30 are connected to an air-conditioner ECU 60. This air-conditioner ECU 60 controls the cooling ability by controlling the starting/stopping and speed of the compressor motor 20, as well as controls the volume of supply air (i.e., the blower air volume Va) by controlling the starting/stopping and speed of the blower motor 30.

The air-conditioner ECU 60 is also connected to an actuator 62 that operates the switching damper 32, an actuator 64 that operates the mode switching damper 34, and an actuator 66 that rotates the air mixing damper 38.

Further, the air-conditioner ECU 60 is connected to various sensors that detect the environmental conditions and the operating state when the air-conditioner 10 is operating. These sensors include, for example, a cabin temperature sensor 68 that detects the temperature inside the cabin, an outside air temperature sensor 70 that detects the temperature outside the vehicle (i.e., the outside air temperature), a sunload sensor 72 that detects the amount of solar radiation, a post-evaporator temperature sensor 74 that detects the temperature of the air that has passed through the evaporator 18, and a coolant temperature sensor 76 that detects the temperature of the coolant supplied to the heater core 36. Incidentally, the temperature of coolant coming from the engine 40 may be detected by the engine ECU 58 and the coolant temperature sensor 76 may detect the temperature of the coolant that actually flows through the heater core 36. Also, the coolant temperature may be predicted based on the temperature of the coolant coming from the engine 40, which is detected by the engine ECU 58, as the temperature of coolant that actually flows through the heater core 36.

The air-conditioner ECU 60 is also connected to an operating panel 78 with which the settings of the operating conditions and the like, as well as commands such as starting and stopping commands and the like are input. When the operating mode and operating conditions such as the set temperature and the like are set according to a switch operation of the operating panel 78, the air-conditioner ECU 60 controls the compressor motor 20 (i.e., the compressor 12), the blower motor 30 (i.e., the blower fan 24), and the actuators 62 to 66 and the like based on the environmental conditions and the operating conditions that were set.

For example, the air-conditioner ECU 60 sets a target supply air temperature $T_{AO}$ to make the temperature in the cabin a set temperature $T_{SET}$ based on the set temperature $T_{SET}$ that was set on the operating panel 78. The air-conditioner ECU 60 then sets the opening amount S of the air mixing damper 38 based on this target supply air temperature $T_{AO}$. Also, when there is a command for the air-conditioner 10 to operate in an auto-mode, the air-conditioner ECU 60 sets the volume of the supply air (i.e., the blower air volume) Va and the air-conditioning mode and the like.

The target supply air temperature $T_{AO}$ is obtained using a general operational expression from the set temperature $T_{SET}$, the cabin temperature Tr detected by the cabin temperature sensor 68, the outside air temperature To detected by the outside air temperature sensor 70, and the amount of solar radiation ST detected by the sunload sensor 72.

$$T_{AO}=K_1 \times T_{SET}-K_2 \times T_o-K_3 \times T_r-K_4 ST+C \text{ (where } K_1, K_2, K_3, K_4, \text{ and C are preset constants)}$$

Also, the set temperature $T_{SET}$, the preset temperature or the cabin temperature Tr or the like is used as a reference temperature, and the blower air volume Va is set from this reference temperature and the target supply air temperature $T_{AO}$. For example, when the set temperature $T_{SET}$ is used as the reference temperature, the blower air volume Va can be set to be low when the target supply air temperature $T_{AO}$ is close to the set temperature $T_{SET}$ (i.e., when the difference between the two is small) and increase as the difference between the target supply air temperature $T_{AO}$ and the set temperature $T_{SET}$ increases.

Also, the opening amount S of the air mixing damper 38 of the air-conditioner 10 is controlled so that the temperature when the air that has passed through the evaporator 18 and the heater core 36 has mixed with the air that has passed through the evaporator 18 but has bypassed the heater core 36 matches the target supply air temperature $T_{AO}$.

When the ratio of the amount of air that has passed through the heater core 36 and the amount of air that has bypassed the heater core 36 is designated mixture ratio r, this mixture ratio r is determined by the opening amount S of the air mixing damper 38. Also, the opening amount S of the air mixing damper 38 is obtained from the mixture ratio r. This kind of mixture ratio r can be calculated from the temperature of the air that has passed through the evaporator 18 (i.e., the post-evaporator temperature Te) and the temperature of the air that has passed through the heater core 36 (i.e., the post-heater core temperature Th).

The mixture ratio r is obtained according to the following expression: $r=(T_{AO}-Te)/(Th-Te)$. At this time, the post-evaporator temperature Te is detected by the post-evaporator temperature sensor 74, and the post-heater core temperature Th can be detected by providing a temperature sensor downstream of the heater core 36. Alternatively, the post-heater core temperature Th can be calculated using the temperature Tw of coolant that passes through the heater core 36, the flowrate Vw of the coolant, the blower air volume Va, the post-evaporator temperature Te, and the heat efficiency determined by the particular heater core 36 used. Of these values, the flowrate Vw of the coolant flowing through the heater core 36, which is unknown, is determined by the speed of the electric pump 50. Therefore, the mixture ratio r can also be calculated by obtaining the speed of the electric pump from the engine ECU 58.

The air-conditioner ECU 60 calculates the blower air volume Va and the mixture ratio r, sets the driving voltage of the blower motor 30 based on the blower air volume Va, and sets the driving amount of the actuator 66 that opens and closes the air mixing damper 38 based on the mixture ratio r. The air-conditioner ECU 60 then drives the blower motor 30 and controls the opening of the air mixing damper 38 by driving the actuator 66 (i.e., performs A/M control), based on these settings, to produce supply air of the target supply air temperature $T_{AO}$.

In this kind of A/M control, the air-conditioner ECU 60 performs air-conditioning with the air mixing damper 38 completely closed (i.e., opening amount S=0) (MAXCOOL) when the cooling load is large, and increases the opening amount S of the air mixing damper 38 when the heating load increases, for example. Also, when heating at maximum capacity at that time, the air-conditioner ECU 60 sets the air mixing damper 38 completely open (i.e., opening amount S=100) (MAXHOT).

When the cabin is being air-conditioned (i.e., heated) using coolant and the speed of the electric pump 50 is reduced to save energy, the flowrate Vw of the coolant that is circulated through the heater core 36 is reduced so the desired heating effect may not be able to be achieved.

Therefore, in the air-conditioner 10, the air-conditioner ECU 60 sets the flowrate of the coolant as the required flowrate Vr so that it will not be unpleasant for the occupants while suppressing the flowrate Vw of the coolant, based on the blower air volume Va and the coolant temperature Tw and the like.

The air-conditioner ECU 60 directs the engine ECU 58 to drive the electric pump 50 (i.e., directs the engine ECU 58 to circulate coolant) to achieve the required flowrate Vr that is set according to preset conditions such as the blower air volume Va and the coolant temperature Tw and the like.

Also, the engine ECU 58 drives the electric pump 50 based on the driving state of the engine 40 and the coolant temperature, as well as controls the speed of the electric pump 50 so that the flowrate Vw of coolant that flows through the heater core 36 comes to match the required flowrate Vr when a signal indicative of the required flowrate Vr of the coolant is received from the air-conditioner ECU 60.

In the heater core 36, it is difficult to heat the air passing through it uniformly due to temperature swings at the surface of the heater core 36 when the coolant flowrate Vw drops. Also, the heat exchange efficiency drops when the flowrate Vw becomes too large.

In the air-conditioner 10, a minimum flowrate Vmin and a maximum flowrate Vmax of the required flowrate Vr are set within a range between a minimum value of the flowrate Vw of coolant to the heater core 36 which is determined from the viewpoint of preventing swings in temperature at the surface of the heater core 36, and a maximum value of the flowrate Vw of coolant to the heater core 36 which is determined from the viewpoint of conserving energy. The air-conditioner ECU 60 sets the required flowrate Vr within this range between the minimum flowrate Vmin and the maximum flowrate Vmax (i.e., Vmin≤Vr≤Vmax). Incidentally, in the following description, the minimum flowrate Vmin is 6 l/min (liters per minute) and the maximum flowrate Vmax is 16 l/min.

Meanwhile, if the coolant temperature is low when an ignition switch, not shown, is turned on and the engine 40 is started, the engine ECU 58 performs a warm-up operation for the engine 40. At this time while the coolant temperature is low, the engine ECU 58 stops the electric pump 50 to promote a rise in coolant temperature.

Also, when the coolant temperature drops due to the engine 40 being stopped, the engine ECU 58 stops the electric pump 50 to suppress a drop in coolant temperature.

Here, when the coolant temperature is low during a heating operation, the air-conditioner ECU 60 stops the blower fan 24 to prevent cool air from being blown into the vehicle cabin.

When the temperature Tw of the coolant that circulates through the heater core 36 reaches a predetermined temperature, the air-conditioner ECU 60 drives the blower fan 24 at the minimum air volume and increases the speed of the blower fan 24 to increase the blower air volume Va as the temperature Tw of the coolant increases. Also, when the temperature Tw of the coolant that circulates though the heater core 36 drops, the air-conditioner ECU 60 reduces the blower air volume Va and then stops the blower fan 24 (i.e., the blower motor 30) when the temperature Tw of the coolant falls to a predetermined temperature or below.

Figure 3:
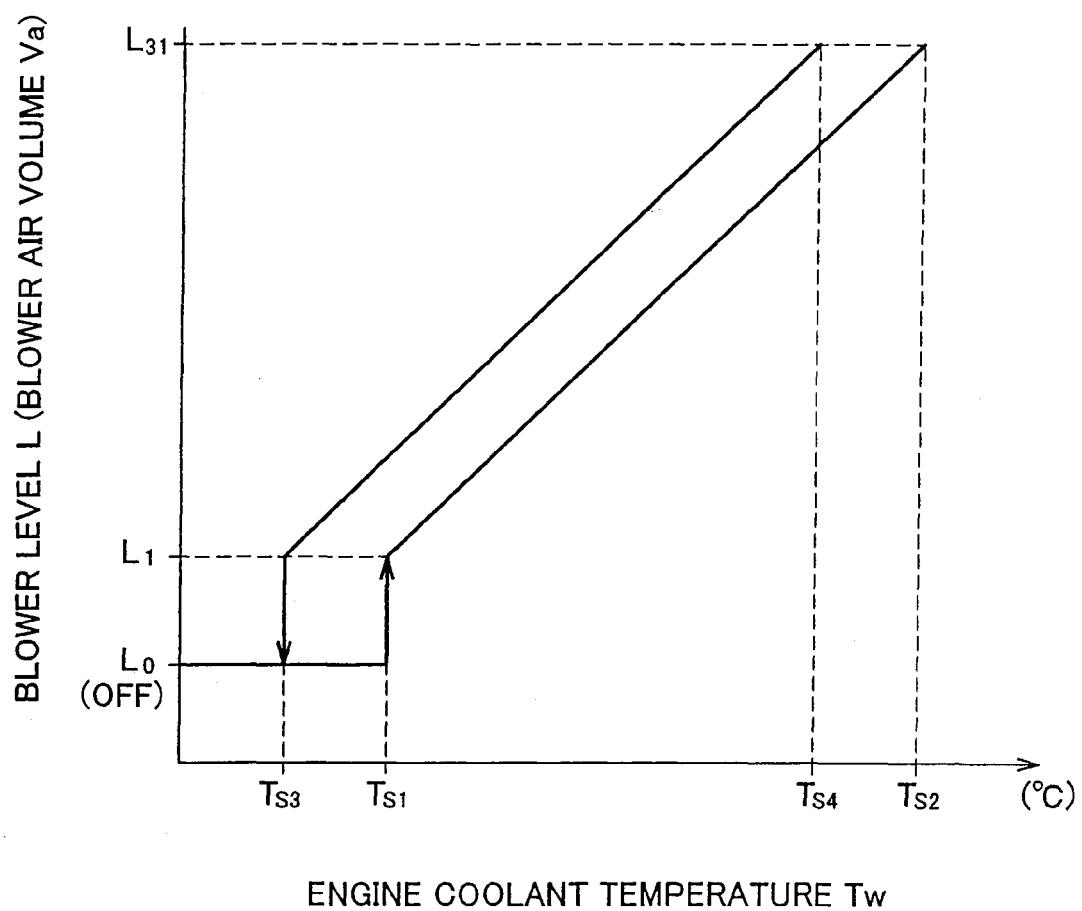
FIG. 3 is a line diagram showing an example of blower air volume with respect to the coolant temperature during a heating operation.

FIG. 3 is a line diagram showing an example of the blower air volume Va (blower level L) with respect to the coolant temperature Tw. Incidentally, in FIG. 3 the blower air volume Va corresponds to the blower level L which changes in 31 steps from $L_1$ to $L_{31}$. The driving voltage of the blower motor 30 is set according to the blower level L.

As shown in FIG. 3, in the air-conditioner ECU 60 a set temperature $T_{S1}$ which is a second set temperature, and a set temperature $T_{S2}$ which is higher than the set temperature $T_{S1}$ are set (i.e., $T_{S1} < T_{S2}$, e.g., $T_{S1}=40°$ C. and $T_{S2}=65°$ C.). The air-conditioner ECU 60 stops the blower fan 24 (i.e., blower level L) until the coolant temperature Tw reaches the set temperature $T_{S1}$. When the coolant temperature Tw reaches the set temperature $T_{S1}$, the air-conditioner ECU 60 sets the blower air volume Va to the lowest air volume (i.e., blower level $L_1$) and drives the blower fan 24. Also, after the blower fan 24 starts, the blower level L is increased as the coolant temperature Tw rises until the coolant temperature Tw reaches the set temperature $T_{S2}$.

Further, in the air-conditioner ECU 60, a set temperature $T_{S3}$ which is a first set temperature that is lower than the set temperature $T_{S1}$, and a set temperature $T_{S4}$ which is lower than the set temperature $T_{S2}$ are set so there is hysteresis in the blower level L with respect to the coolant temperature Tw (i.e., $T_{S3} < T_{S1} < T_{S4} < T_{S2}$, e.g., $T_{S3}=36°$ C. and $T_{S4}=61°$ C. when the temperature width is a hysteresis of 4° C.). When the coolant temperature Tw drops, the air-conditioner ECU 60 reduces the blower level L from the set temperature $T_{S4}$ according to the coolant temperature Tw. When the coolant temperature Tw falls below the set temperature $T_{S3}$, the air-conditioner ECU 60 stops the blower fan 24 (sets the blower level to L).

The air-conditioner ECU 60 sets the blower level L to the upper limit of the blower air volume Va with respect to the coolant temperature Tw, for example, and drives the blower fan 24.

In this case, when attempting to raise the coolant temperature during a warm-up operation when the engine 40 is first started, for example, the air-conditioner ECU 60 outputs a command to circulate coolant before the coolant temperature reaches the set temperature $T_{S1}$.

For example, when the coolant temperature Tw reaches the set temperature $T_{S3}$ which is lower than the set temperature $T_{S1}$ which is the temperature at which the blower fan 24 starts to be driven, the air-conditioner ECU 60 sets the required flowrate Vr to the minimum flowrate Vmin and outputs a command to circulate coolant. As a result, the heater core 36 is warmed up by the engine ECU 58 driving the electric pump 50 and circulating coolant.

Also, when the coolant temperature Tw exceeds the set temperature $T_{S1}$, the air-conditioner ECU 60 sets the required flowrate Vr based on the blower air volume Va (i.e., the blower level L), the outside air temperature To detected by the outside air temperature sensor 70, and the coolant temperature Tw.

At this time, the air-conditioner ECU 60 sets a flag Fo with respect to the outside air temperature To and a flag Fw with respect to the coolant temperature Tw, and then sets the required flowrate Vr from a preset map according to the states of the flags Fo and Fw.

Figure 4A:
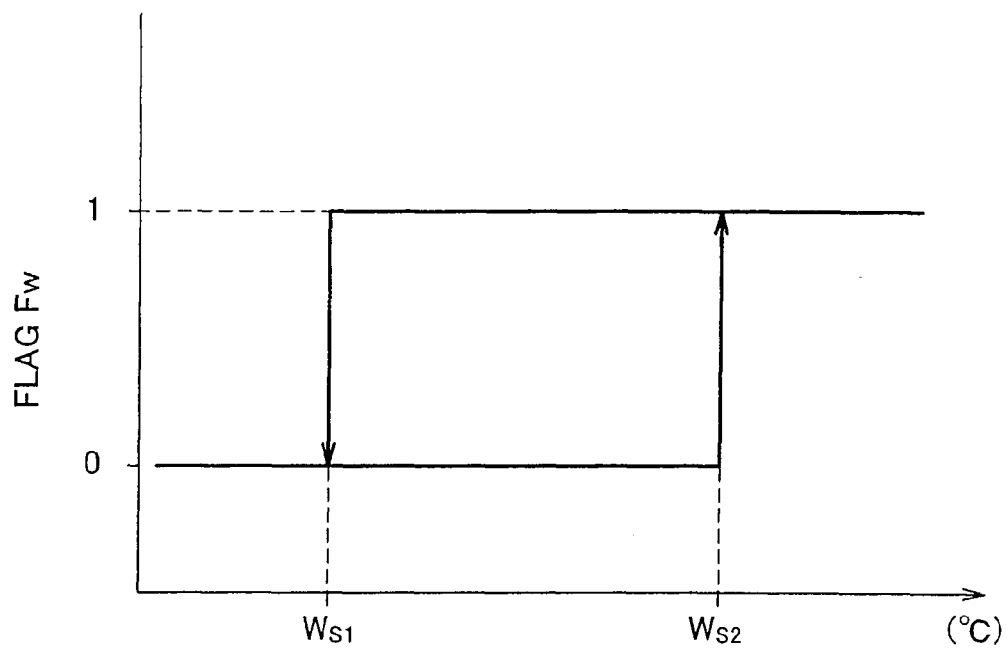
FIG. 4A is a line diagram showing an example of how a flag is set based on the coolant temperature.

FIG. 4A is a line diagram showing an example of how the flag Fw is set. Set temperatures $W_{S1}$ and $W_{S2}$ which are applied to increasing and decreasing the flowrate through the thermostat 52 are used to set the flag Fw. When the temperature Tw of the coolant that flows through the thermostat 52 becomes equal to or higher than the set temperature $W_{S2}$ (e.g., 87° C.), the thermostat 52 completely opens. When the temperature Tw of coolant that flows through the thermostat 52 becomes lower than or equal to the set temperature $W_{S1}$ (e.g., 83° C.), the thermostat 52 completely closes.

At this time, the air-conditioner ECU 60 resets the flag Fw (Fw=0) if the coolant temperature Tw is equal to or less than the set temperature $W_{S1}$ (Tw≤$W_{S1}$), and sets the flag Fw to 1 (Fw=1) if the coolant temperature Tw is equal to or greater than the set temperature $W_{S2}$ (Tw≥$W_{S2}$). Also, after the flag Fw is set the air-conditioner ECU 60 then resets the flag Fw when the coolant temperature Tw drops to the set temperature $W_{S1}$.

Figure 4B:
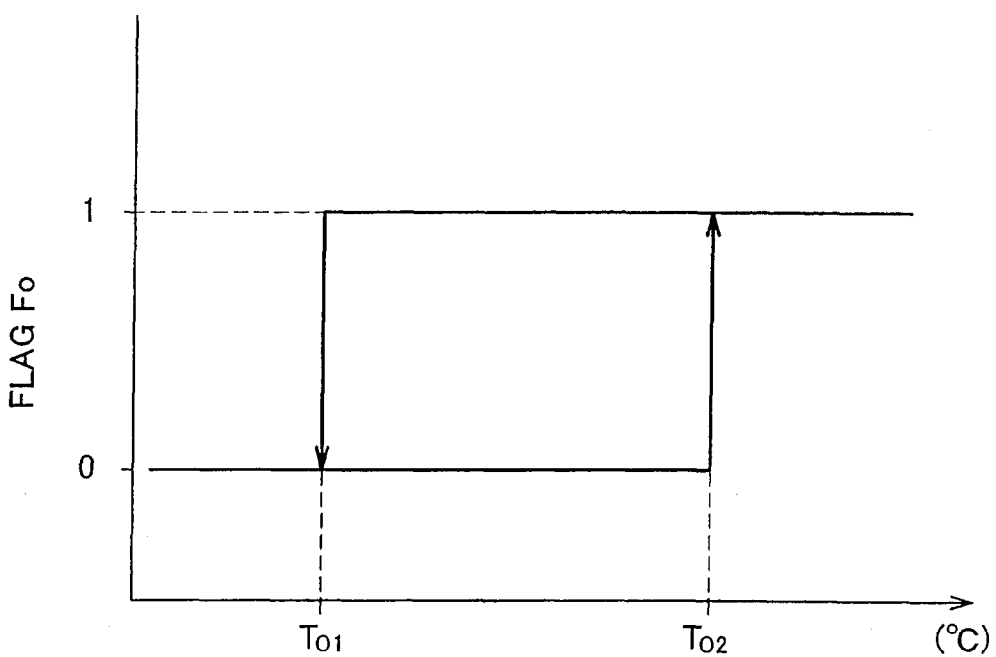
FIG. 4B is a line diagram showing an example of how a flag is set based on the outside air temperature.

FIG. 4B is a line diagram showing an example of how the flag Fo is set. The air-conditioner ECU 60 resets the flag Fo (Fo=0) if the outside air temperature To is equal to or less than a set temperature $T_{O1}$ (for example, $T_{O1}=-9°$ C.) (i.e., To≤$T_{O1}$), and sets the flag Fo to 1 (Fo=1) if the outside air temperature To becomes equal to or greater than the set temperature $T_{O2}$ (for example, $T_{O2}=-7°$ C.).

Figure 5B:
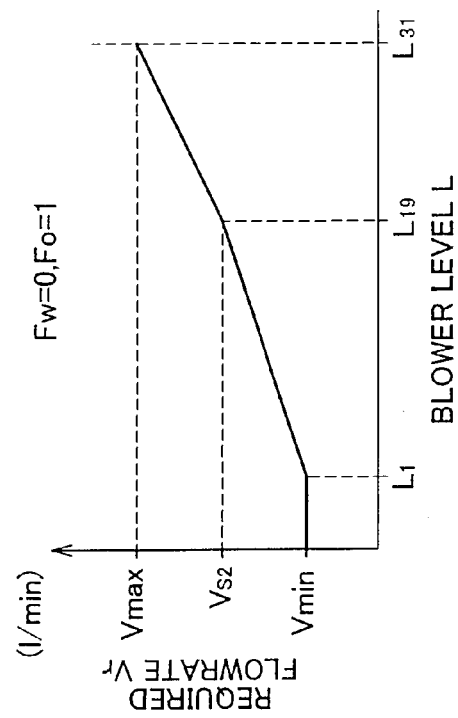
FIGS. 5A to 5D are line diagrams showing examples of how a required flowrate is set with respect to blower air volume (blower level) according to the state of the coolant temperature flag and the outside air temperature flag.
Figure 5D:
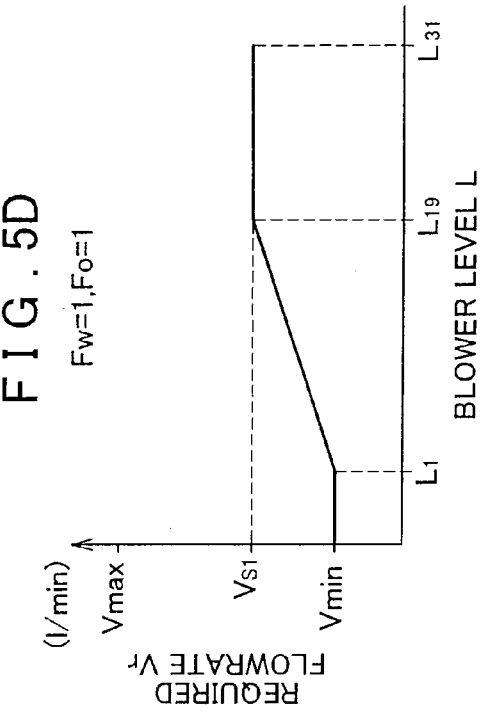
Figure 5A:
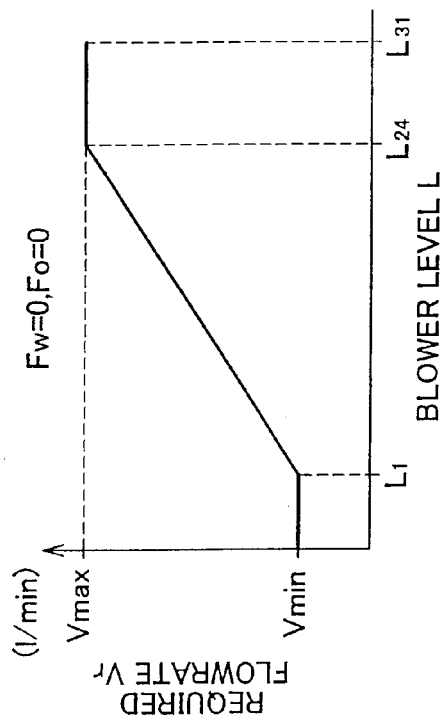

FIGS. 5A to 5D are show examples of maps of the required flowrate Vr with respect to the blower level L according to the state of the flags Fw and Fo. FIG. 5A corresponds to a case in which the thermostat 52 is closed (flag Fw=0) and the outside air temperature To is low (flag Fo=0). FIG. 5B corresponds to a case in which the thermostat 52 is closed (flag Fw=-0) and the outside air temperature To is high (flag Fo=1). Also, FIG. 5C corresponds to a case in which the thermostat 52 is open (flag Fw=1) and the outside air temperature To is low (flag Fo=0), and FIG. 5D corresponds to a case in which the thermostat 52 is open (flag Fw=1) and the outside air temperature To is high (flag Fo=1).

Here, the heating ability of the air-conditioner 10 increases when the coolant temperature Tw is high. With any given coolant temperature Tw, the heating ability can be increased by increasing the required flowrate Vr of coolant, while energy can be conserved by reducing that required flowrate Vr.

Figure 5C:
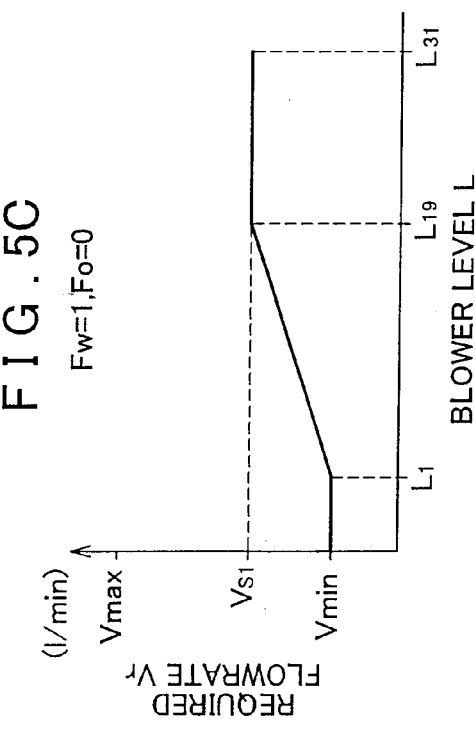

Therefore, in the air-conditioner ECU 60, when the coolant temperature Tw is high (i.e., flag Fw=−1), energy can be conserved by setting the upper limit of the required flowrate Vr of the coolant to a set flowrate $V_{S1}$ that is less than the maximum flowrate Vmax (e.g., set flowrate $V_{S1}$=10 l/min) (applies to FIG. 5C or 5D).

Also, when the coolant temperature Tw is low, the heating ability can be maintained by having the air-conditioner ECU 60 be able to select any required flowrate Vr up to the maximum flowrate Vmax. At this time, if the outside air temperature To is low, (i.e., flag Fo=0, FIG. 5A), the required flowrate Vr is increased with respect to the blower level L more so than it is when the outside air temperature To is high (i.e., flag Fo=1, FIG. 5B). Incidentally, in FIG. 5B (flag Fw=0, flag Fo=1), the gradient of the required flowrate Vr with respect to the blower level L is set lower than that in FIG. 5A (flag Fw=0, flag Fo=0). For example, a set flowrate $V_{S2}$=14 l/min as a required flowrate Vr corresponding to the blower level L of L19 in FIG. 5B (flag Fw=0, flag Fo=1) is set lower than the required flowrate Vr corresponding to the blower level L of L19 in FIG. 5A (flag Fw=0, flag Fo=0).

Meanwhile, in the air-conditioner 10, the BI-LEVEL mode is set which blows out supply air both toward the occupant from the dashboard outlet 28B and toward the feet of the occupant from the floor outlet 28C. When the BI-LEVEL mode is selected or set as the air-conditioning mode, the air-conditioner ECU 60 corrects the required flowrate Vr by adding a correction flowrate α to the required flowrate Vr according to the coolant temperature Tw (i.e., Vr=Vr+α). At this time, if the coolant temperature Tw is low, the correction flowrate α is increased to make the occupant feel warm. If, on the other hand, the coolant temperature Tw is high, the correction flowrate α is reduced to prevent the occupant from feeling too hot.

Figure 6:
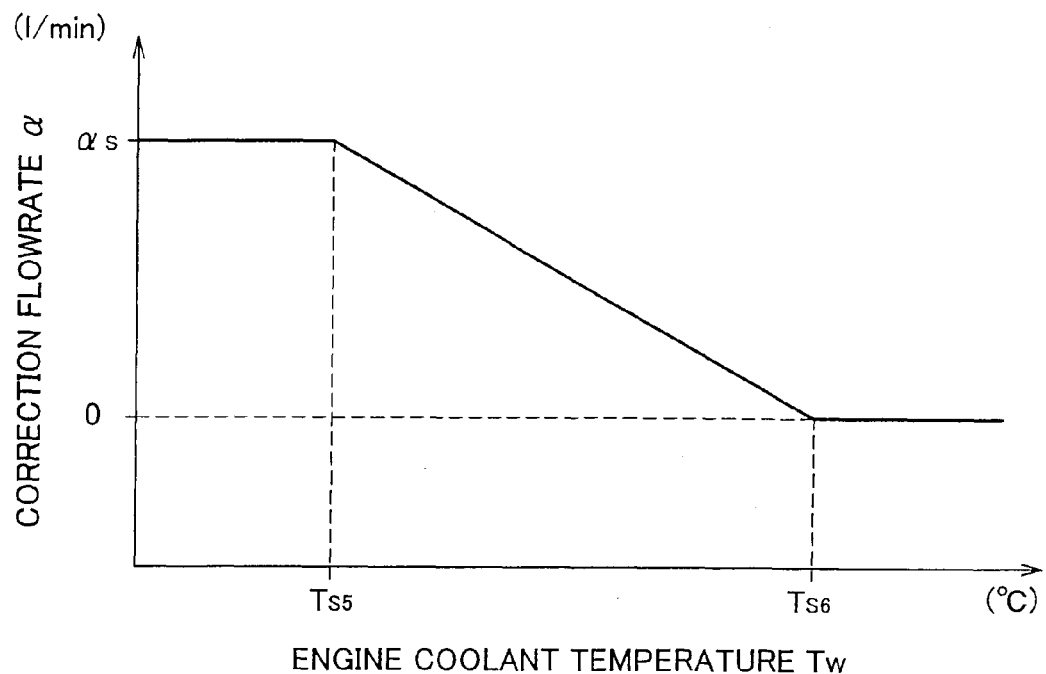
FIG. 6 is a line diagram showing an example of how a correction flowrate of the required flowrate is set with respect to the coolant temperature.

FIG. 6 shows an example of a map of the correction flowrate a with respect to the coolant temperature Tw at this time. On this map, the maximum value of the correction flowrate α is the correction flowrate as (e.g., as =3 l/min). If the coolant temperature Tw is equal to or less than a set temperature $T_{S5}$ (Tw≤$T_{S5}$, e.g., $T_{S5}$=55° C.), the flowrate as is set as the correction flowrate α. Also, if the coolant temperature Tw is equal to or greater than a set temperature $T_{S6}$ (Tw≥$T_{S6}$, e.g., $T_{S6}$=70° C.), it is determined that the heating ability is good enough to obtain a sufficient feeling of warmth so no correction is made (i.e., correction flowrate α=0). If the coolant temperature Tw is between the set temperature $T_{S5}$ and the set temperature $T_{S6}$ (i.e., $T_{S5}$<Tw<$T_{S6}$), the correction flowrate α is reduced as the coolant temperature Tw increases.

Meanwhile, the air-conditioner ECU 60 is connected to a vehicle speed sensor 80 that detects the running speed of the vehicle. Therefore, the air-conditioner ECU 60 is able to detect the running speed of the vehicle (hereinafter simply referred to as the "vehicle speed Sv") using this vehicle speed sensor 80. Incidentally, the vehicle speed Sv is also detected by the engine ECU 58. The vehicle speed Sv detected by the engine ECU 58 may be the vehicle speed Sv that is obtained by the air-conditioner ECU 60.

If the coolant temperature Tw is less than the set temperature $T_{S1}$ or the set temperature $T_{S3}$, the air-conditioner ECU 60 stops requiring a flowrate (i.e., required flowrate Vr=0) and stops the blower fan 24 (see FIG. 3). However, if this is done while the fresh air mode is set, unheated ram air will be blown from the outlet by the ram pressure generated as the vehicle moves.

Therefore, if the vehicle speed Vs detected by the vehicle speed sensor 80 rises beyond a set speed, the air-conditioner ECU 60 outputs a command to circulate coolant while leaving the blower fan 24 stopped. The required flowrate Vr at this time is preferably low so the air-conditioner ECU 60 sets it to the minimum flowrate Vmin.

Figure 7:
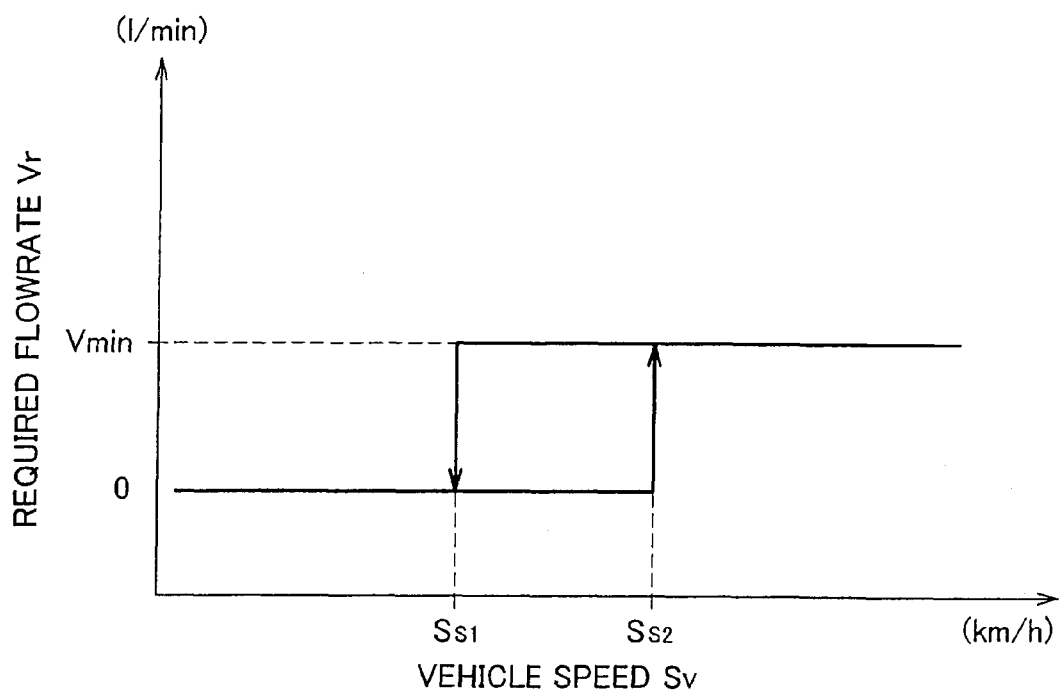
FIG. 7 is a line diagram showing an example of how the required flowrate is set with respect to vehicle speed.

FIG. 7 is a line diagram showing an outline of how the required flowrate Vr is set at this time. Set speeds $S_{S1}$ and $S_{S2}$ ($S_{S1}$<$S_{S2}$, e.g., $S_{S1}$=45 km/h and $S_{S2}$=50 km/h) are set in the air-conditioner ECU 60. If the vehicle speed Sv becomes equal to or greater than the set speed $S_{S2}$, (i.e., Sv≥$S_{S2}$), then the air-conditioner ECU 60 sets the minimum flowrate Vmin as the required flowrate Vr and outputs a command to operate the electric pump 50 (i.e., outputs a command to circulate coolant). Also, if the vehicle speed Sv becomes equal to or less than the set speed $S_{S1}$ (i.e., Sv≤$S_{S1}$), the air-conditioner ECU 60 stops requiring a flowrate (i.e., required flowrate Vr=0).

Also, the air-conditioner 10 has a DEF switch 82 provided on the operating panel 78. When the front windshield fogs up and an occupant operates the DEF switch 82 to defog it, the air-conditioner ECU 60 performs air-conditioning with the air-conditioning mode set to the DEF mode.

When air-conditioning is performed in the DEF mode, the air-conditioner ECU 60 increases the heating ability by increasing the required flowrate Vr of the coolant. Also, the air-conditioner ECU 60 sets the required flowrate Vr at this time based on the outside air temperature To detected by the outside air temperature sensor 70.

Figure 8:
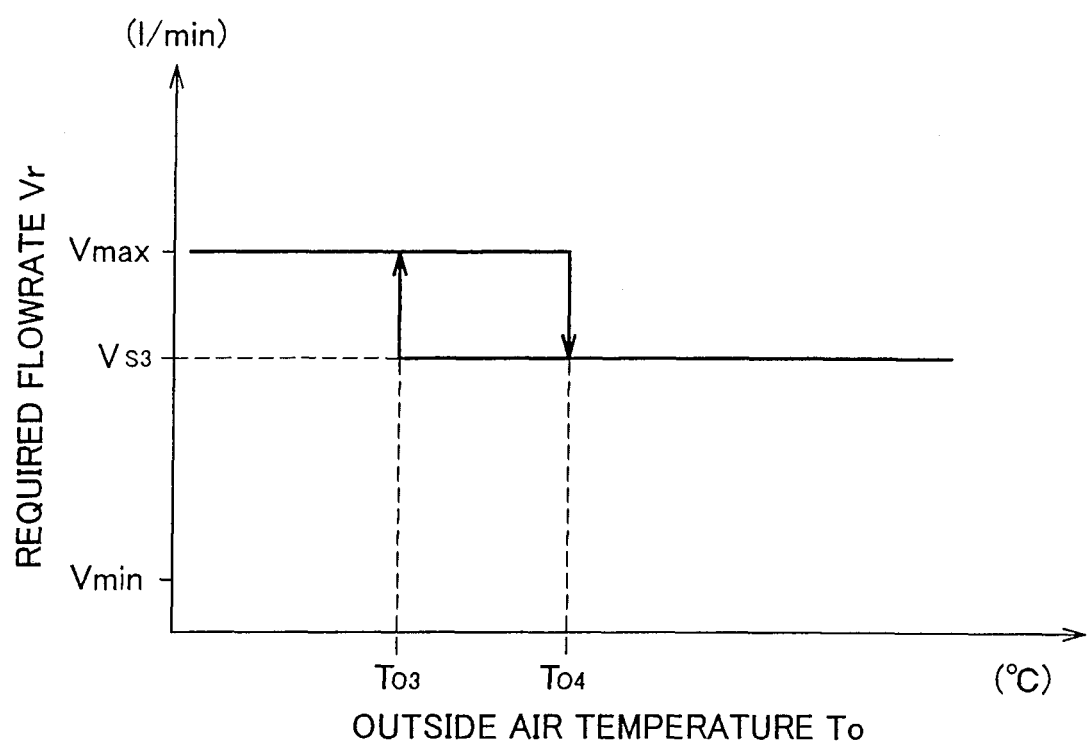
FIG. 8 is a line diagram showing an example of the required flowrate is set with respect to the outside air temperature.

FIG. 8 is a line diagram showing an example of the required flowrate Vr with respect to the outside air temperature To when the DEF mode has been set. Incidentally, in the air-conditioner 10, the required flowrate Vr is divided into two levels, i.e., the maximum flowrate Vmax and a set flowrate $V_{S3}$ that is slightly less than the maximum flowrate Vmax (e.g., $V_{S3}$=14 l/min). The air-conditioner ECU 60 sets the required flowrate Vr to one of these based on the outside air temperature To.

Also, in the air-conditioner ECU 60, a set temperature $T_{O3}$ and a set temperature $T_{O4}$ ($T_{O3}$<$T_{O4}$, e.g., $T_{O3}$=0° C. and $T_{o4}$=2° C.) are set as the outside air temperature To when the required flowrate Vr is set. When the outside air temperature To is equal to or greater than the set temperature $T_{O4}$ (i.e., To≥$T_{O4}$), the air-conditioner ECU 60 sets the required flowrate Vr to the set flowrate $V_{S3}$, and when the outside air temperature To is equal to or less than the set temperature $T_{O3}$ which is less than the set temperature $T_{O4}$ (i.e., To≤$T_{O3}$), the air-conditioner ECU 60 sets the required flowrate Vr to the maximum flowrate Vmax. Incidentally, when the outside air temperature To becomes equal to or greater than the set temperature $T_{O4}$ while the required flowrate Vr is set to the maximum flowrate Vmax, the air-conditioner ECU 60 reduces the required flowrate Vr to the set flowrate $V_{S3}$, and if the outside air temperature To becomes equal to or less than the set temperature $T_{O3}$ while the required flowrate Vr is set to the set flowrate $V_{S3}$, the air-conditioner ECU 60 increases the required flowrate Vr to the maximum flowrate Vmax.

Incidentally, when the DEF mode is selected, the air-conditioner ECU 60 increases the blower air volume Va (i.e., increases the blower level L), for example, to promote defogging/defrosting of the windshield.

Hereinafter, the operation of this example embodiment will be described.

When an ignition switch, not shown, is turned on and the vehicle provided with the air-conditioner 10 starts to run, the vehicle runs with the engine ECU 58 and the hybrid ECU 58A controlling the driving of the engine 40 and an electric motor, not shown.

Also, if the temperature of the coolant of the engine 40 is low when the ignition switch, not shown, is turned on, the engine ECU 58 performs an operation to warm up the engine 40. While the coolant temperature is low at this time, the engine ECU 58 stops the electric pump 50 in an attempt to promote engine warm-up. Incidentally, the vehicle may be provided with an exhaust heat recovery system that heats coolant using the heat of the exhaust from the engine 40. In this case, even when the engine 40 is being warmed up, the electric pump 50 may be operated to circulate coolant to improve exhaust heat recovery efficiency and promote engine warm-up.

Meanwhile, when the vehicle starts to run, the engine ECU 58 and the hybrid ECU 58A control the operation of the engine 40 and the electric motor, not shown. At this time the engine ECU 58 performs eco-run control which stops the engine 40 when a preset engine stop condition is satisfied and starts the engine 40 when an engine restart condition is satisfied while the engine 40 is stopped.

If the coolant temperature at this time decreases, the engine ECU 58 stops the electric pump 50 in an attempt to keep the coolant temperature from dropping further.

Incidentally, in a hybrid vehicle, when the vehicle is decelerating, regenerative power generation is performed by driving a motor-generator to apply a load against the rotation of the tires which causes the vehicle to decelerate. The power that is generated (i.e., regenerated power) is stored in a battery (i.e., charges the battery) as power for running. When regenerative power generation is performed, the speed of the electric motor 50 may be increased using the regenerated power. As a result, the power generation efficiency improves.

When the operating condition is set, the air-conditioner ECU 60 sets the target supply air temperature $T_{AO}$ based on the operating condition and the environmental conditions, and air-conditions the cabin while performing air mixing damper control (AIM control) that controls the opening amount S of the air mixing damper 38 to obtain supply air of the target supply air temperature $T_{AO}$.

At this time, in the air-conditioner 10 in this example embodiment, the required flowrate Vr of the coolant is set according to the outside air temperature To, the vehicle speed Sv, and the coolant temperature Tw and the like. The air-conditioner ECU 60 sets the required flowrate Vr of the coolant and outputs a command to the engine ECU 58 to circulate the coolant of the required flowrate Vr to the heater core 36. Also, upon receiving the command from the air-conditioner ECU 60 to circulate the required flowrate Vr of coolant, the engine ECU 58 operates the electric pump so that the flowrate Vw of the coolant circulated to the heater core 36 matches the required flowrate Vr.

Here, required flowrate control of the coolant by the air-conditioner ECU 60 will be described with reference to the flowchart shown in FIGS. 9A and 9B. The routine shown in the flowchart is executed when the ignition switch of the vehicle, which is not shown, is turned on and there is a command to operate the air-conditioner 10. The routine ends when either the air-conditioner 10 or the ignition switch is turned off. Also, in the air-conditioner 10, the target supply air temperature $T_{AO}$ is set based on the set operating condition and the environmental conditions, and the cabin is air-conditioned while controlling the opening amount S of the air mixing damper 38 based on the set target supply air temperature $T_{AO}$.

Figure 9A:
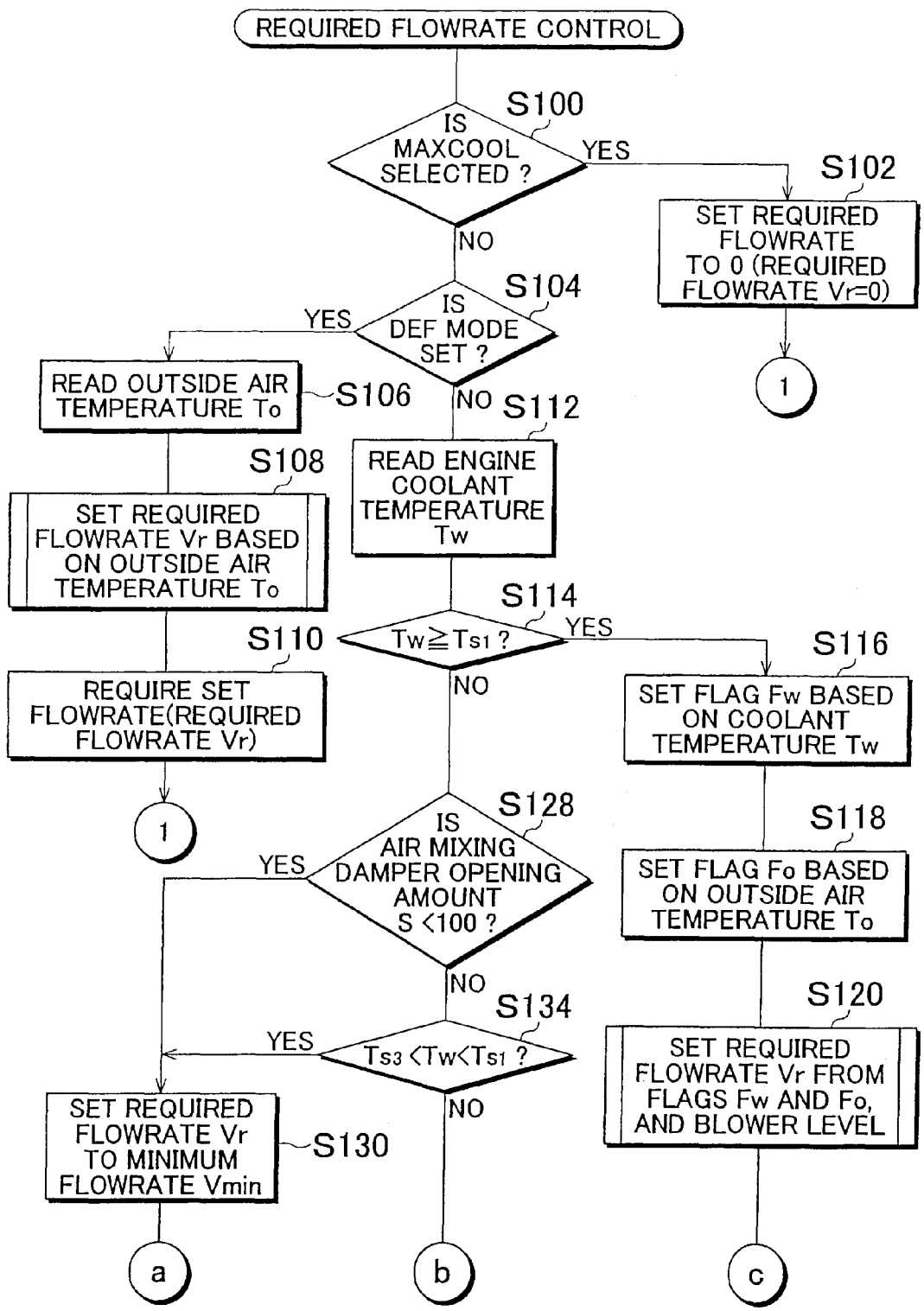
FIGS. 9A and 9B are flowcharts illustrating an outline of how the required flowrate of coolant is set according to the example embodiment.
Figure 9B:
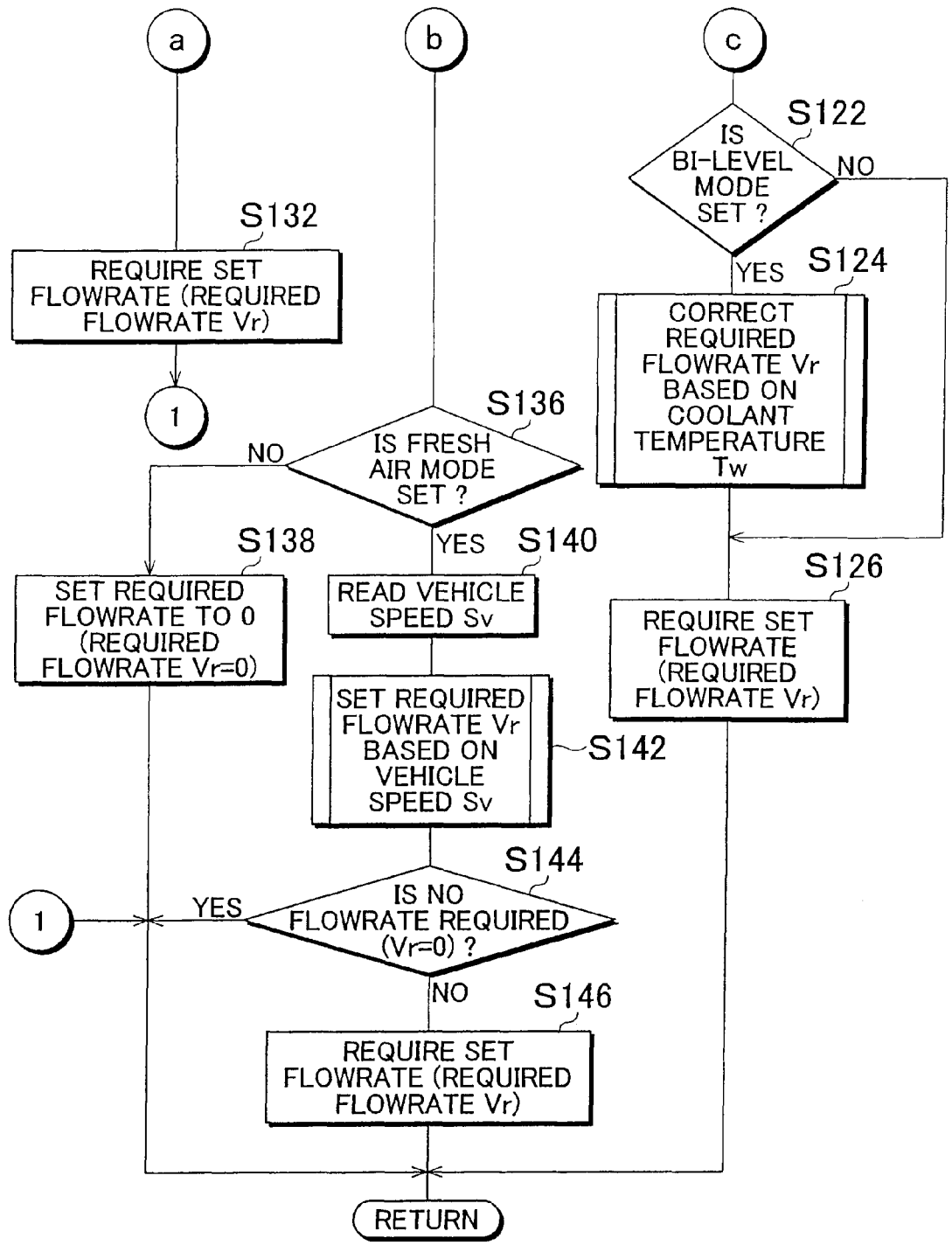

In the flowchart shown in FIGS. 9A and 9B, it is first determined in step 100 whether MAXCOOL, in which the air mixing damper 38 is completely closed (i.e., opening amount S=0), is set. If the heating load is small and the cooling load is large, it is not necessary to heat the supply air using the heater core 36 so the air-conditioner ECU 60 performs air-conditioning (cool operation) at MAXCOOL in which the air mixing damper 38 is completely closed.

Therefore at this time, the determination in step 100 is yes (Y) so the process proceeds on to step 102 where the required flowrate Vr is set to 0. Accordingly, the engine ECU 58 controls the electric pump 50 based on the speed of the engine 40. When the engine 40 stops, the electric pump 50 also stops.

If, on the other hand, there is a heating load, the air mixing damper 38 is opened according to that heating load (i.e., not MAXCOOL). Therefore the determination at this time in step 100 is no (N) so the process proceeds on to step 104 where it is determined whether the DEF mode is set.

The windows of the vehicle tend to fog up when the surface temperature is low due to a low outside air temperature. When the front windshield fogs up, it impairs forward visibility. If the DEF switch 82 is turned on at this time, the air-conditioner ECU 60 switches the air-conditioning mode to the DEF mode such that supply air is blown out from the defroster outlet 28A toward the front windshield. At this time, the air-conditioner ECU 60 sets the air mixing damper 38 to the maximum opening amount (MAXHOT) to prevent the front windshield from fogging up.

Also, if the DEF switch 82 is turned on such that air-conditioner ECU 60 switches the air-conditioning mode to the DEF mode, the determination in step 104 is yes so the process proceeds on to step 106.

In step 106, the outside air temperature To detected by the outside air temperature sensor 70 is read, and in the next step, step 108, the required flowrate $V_r$ of the coolant is set based on the outside air temperature To.

As shown in FIG. 8, in the air-conditioner 10, the required flowrate Vr with respect to the outside air temperature when the DEF mode is selected is set and the air-conditioner ECU 60 sets the required flowrate Vr based on the outside air temperature To and the map shown in FIG. 8.

Here, if the outside air temperature To is equal to or greater than the set temperature $T_{O4}$ (i.e., To≥$T_{O4}$), the air-conditioner ECU 60 sets the required flowrate Vr to the set flowrate $V_{S3}$ which is lower than the maximum flowrate Vmax. On the other hand, if the outside air temperature To is equal to or less than the set temperature $T_{O3}$, the air-conditioner ECU 60 sets the required flowrate Vr to the maximum flowrate Vmax.

Then, in step 110 in FIG. 9A, the air-conditioner ECU 60 directs the engine ECU 58 to generate a flowrate such that coolant will flow through the heater core 36 at the set required flowrate Vr. Accordingly, the engine ECU 58 controls the speed of the electric pump 50 to obtain the required flowrate Vr, and as a result, the air-conditioner 10 prevents the front windshield from fogging up with a large heating capability.

Here, in the air-conditioner 10, the set temperatures (i.e., the set temperatures $T_{O3}$ and $T_{O4}$) with respect to the outside air temperature are temperatures at which it can be determined whether moisture adhered to the front windshield may freeze.

That is, if the set temperature $T_{O3}$=0° C., it can be determined whether the outside air temperature To is below the freezing point (i.e., To≤0° C.). If the outside air temperature To is below the freezing point, moisture adhered to the front windshield may freeze. In order to defrost the windshield, a large amount of heat must be able to be supplied. Therefore, if the outside air temperature To is equal to or less than the set temperature $T_{O3}$ (i.e., $T_{O3}=0°$ C.), the required flowrate Vr is set to the maximum flowrate Vmax in order to thaw frozen moisture adhered to the front windshield and prevent more moisture from freezing to the front windshield.

Also, when the outside air temperature To is relatively high, moisture adhered to the front windshield will not freeze so a large heating capability for defrosting is not necessary. Therefore, it can be determined that only a heating capability for defogging the front windshield, which fogs up due to increased humidity in the cabin from the occupants in the cabin breathing and the like, is necessary. Thus, the speed of the electric pump 50 will increase unnecessarily if the required flowrate Vr is set to the maximum flowrate Vmax at this time.

Therefore, if it is determined that the outside air temperature To is a temperature at which frost will not form on the front windshield and the like, the air-conditioner ECU 60 sets the required flowrate Vr to the set flowrate $V_{S3}$ which is lower than the maximum flowrate Vmax. As a result, the speed of the electric pump 50 can be reduced so that energy can be saved while still maintaining the ability to defog the front windshield.

Incidentally, in this example embodiment, the required flowrate Vr when the DEF mode is selected is divided into two levels, but it may also be divided into three or more levels based on the outside air temperature To. Also, the set temperatures $T_{O3}$ and $T_{O4}$ with respect to the outside air temperature To are only examples. Any appropriate set temperature may be applied as long as it is a temperature that enables energy to be saved while maintaining the ability to defog/defrost the front windshield.

On the other hand, if the DEF is not selected, the determination in step 104 is no and the process proceeds on to step 112. In step 112 the air-conditioner ECU 60 reads the coolant temperature Tw detected by the coolant temperature sensor 76, and then in step 114 the air-conditioner ECU 60 determines whether the coolant temperature Tw is equal to or greater than the set temperature $T_{S1}$ (see FIG. 3, e.g., 40° C.).

When the coolant temperature Tw exceeds the set temperature $T_{S1}$ during a heating operation, the air-conditioner ECU 60 operates the blower fan 24 to air-condition (i.e., heat) the cabin. Therefore, when the determination in step 114 is yes, the process proceeds on to step 116, where a flag Fw based on the coolant temperature Tw is set (see FIG. 4A). Then in step 118, a flag Fo based on the outside air temperature To is set (see FIG. 4B).

Then in step 120, the air-conditioner ECU 60 selects a map of the required flowrate Vr with respect to the blower air volume Va (i.e., the blower level L) from FIGS. 5A to 5D based on the flags Fw and Fo, and sets the required flowrate Vr based on the selected map and the blower air volume Va (i.e., the blower level L).

Also, in step 122, it is determined whether the air-conditioning mode is set to the BI-LEVEL mode in which the dashboard outlet 28B and the floor outlet 28C are selected.

If the BI-LEVEL mode is selected at this time, the determination in step 122 is yes and the process proceeds on to step 124. In step 124 a correction coefficient α is set based the coolant temperature Tw and a map of the correction coefficient α with respect to the coolant temperature Tw shown in FIG. 6, and the required flowrate Vr is corrected with the correction flowrate a that was set (i.e., Vr=Vr+α).

When the required flowrate Vr is set in this way, a circulation command is output to circulate coolant to the heater core 36 at the set required flowrate Vr in step 126.

On the other hand, if the coolant temperature Tw is lower than the set temperature $T_{S1}$, the determination in step 114 is no and the process proceeds on to step 128. In step 128, it is determined whether the opening amount of the air mixing damper 38 is less than completely open. That is, it is determined whether the setting is neither MAXHOT with insufficient heating capability nor MAXCOOL with unnecessary heating capability.

Here, if the temperature of the supply air is being controlled using the air mixing damper 38 when the coolant temperature Tw is less than the set temperature $T_{S1}$, the air-conditioner 10 is performing a cooling operation so the determination in step 128 is yes and the process proceeds on to step 130 where the required flowrate Vr is set to the minimum flowrate Vmin. Then in step 132, a flowrate command is output to the engine ECU 58 so that coolant is circulated at the minimum flowrate Vmin.

On the other hand, when the air mixing damper 38 is completely open (i.e., S=100), the determination in step 128 is no and the process proceeds on to step 134. In step 134, it is determined whether the coolant temperature Tw is within a range from the set temperature $T_{S3}$ to the set temperature $T_{S1}$.

Here, if the coolant temperature Tw is between the set temperature $T_{S3}$ and the set temperature $T_{S1}$ (i.e., $T_{S3}<Tw<T_{S1}$), the determination in step 134 is yes so the process proceeds on to step 130.

If the coolant temperature Tw has not reached the set temperature $T_{S1}$ when a heating operation is performed, the air-conditioner ECU 60 stops the blower fan 24 to prevent supply air of an unadjusted-temperature (i.e., cool air) from being blown out.

Also, if the coolant temperature Tw reaches the set temperature $T_{S1}$ while the engine 40 is being warmed up, the air-conditioner ECU 60 drives the blower fan 24 and starts to warm-up the engine 40.

However, while the engine 40 is warming up, the electric pump 50 is stopped to promote warm-up of the engine 40 so the temperature Tw of the coolant in the heater core 36 is low. Also, if the blower fan 24 and the electric pump 50 are driven at the timing when the coolant temperature Tw reaches the set temperature $T_{S1}$, the temperature Tw of the coolant that is initially sent to the heater core 36 is likely low, which would result in cool air being blown out when the blower fan 24 is operated.

Therefore, a determination as to whether the coolant temperature Tw has risen to a temperature just under the set temperature $T_{S1}$ is made based on whether the coolant temperature Tw is within the range from the set temperature $T_{S3}$ to the set temperature $T_{S1}$. When the coolant temperature Tw is within this range, the process proceeds on to step 130 where the required flowrate Vr is set to the minimum flowrate Vmin. Then in step 132, a command is output to circulate coolant at the minimum flowrate Vmin.

As a result, the heater core 36 can be warmed up so even if the blower fan 24 is driven and air starts to be blown out when the coolant temperature Tw reaches the set temperature $T_{S1}$, cool air will not be blown into the vehicle cabin so an unpleasant sensation will riot be imparted to the occupants.

If, on the other hand, the coolant temperature Tw is equal to or less than the set temperature $T_{S3}$ (i.e., $Tw \leq T_{S3}$), the determination in step 134 is no so the process proceeds on to step 136. That is, if the coolant temperature Tw is low and the blower fan 24 is stopped while a heating operation is being performed, then it is determined in step 136 whether the air-conditioning mode is set to the fresh air mode and not the recirculation mode.

Here, when the recirculation mode is set instead of the fresh air mode and the inside air inlet 26A is opened by the switching damper 32, the determination in step 136 is no and the process proceeds on to step 138 where the required flowrate is set to zero (i.e., required flowrate Vr=0). As a result, the engine ECU 58 is not directed to circulate coolant so a decrease in the coolant temperature is suppressed and energy is saved.

In contrast, when the fresh air mode is selected and the outside air inlet 26B is opened, the determination in step 136 is yes and the process proceeds on to step 140. In step 140, the vehicle speed Sv detected by the vehicle speed sensor 80 is read. Then in step 142, the required flowrate Vr is set based on the vehicle speed Sv and the map of the required flowrate with respect to the vehicle speed Sv shown in FIG. 7.

Here, if the vehicle accelerates and the vehicle speed Sv becomes equal to or greater than a set speed $S_{S2}$ (e.g., $S_{S2}$=50 km/h) (i.e., Sv≥$S_{S2}$), the required flowrate Vr is set to the minimum flowrate Vmin. Also, if the vehicle decelerates and the vehicle speed Sv becomes equal to or less than a set speed $S_{S1}$ (e.g., $S_{S1}$=45 km/h) (i.e., Sv≤$S_{S1}$), then a flowrate is not required so it is set to 0 (i.e., required flowrate Vr=0).

In this way, when the required flowrate Vr is set based on the vehicle speed Sv while the blower fan 24 is stopped because the coolant temperature Tw is low, then it is determined in step 144 whether no flowrate is required (i.e., required flowrate Vr=0). When a flowrate is required (in this case, the minimum flowrate Vmin), the determination in step 144 is no so the process proceeds on to step 146 where a command to circulate the coolant based on the setting is output.

Typically, air (i.e., ram air) hits the front of a vehicle as it moves (that is, pressure is applied to the front of a vehicle as it moves). If at this time the air-conditioner 10 is in the fresh air mode and the outside air inlet 26B, which is communicated with the outside of the vehicle, is open, outside air is introduced into the air-conditioning unit 22 and blows out from the outlets 28 even if the blower fan 24 is stopped. If the air-conditioner 10 is set to perform a heating operation at this time, the floor outlet 28A is open so cool air would be blown out at the feet of the occupants, which would be unpleasant.

Here, if the air-conditioner 10 is set to the fresh air mode when the coolant temperature Tw is low and the blower fan 24 is stopped, the air-conditioner ECU 60 outputs a command to circulate coolant.

When engine coolant is circulated to the heater core 36 as a result, the air that has been drawn in from the outside air inlet 28B by the ram pressure can be heated, thus preventing cool air from being blown out of the outlets 28 which would be unpleasant for the occupants.

Setting the flowrate Vw of the coolant at this time to the minimum flowrate Vmin makes it possible to suppress cooling of the coolant as well as keeps the speed of the electric pump 50 to the lowest speed necessary, thereby keeping power consumption down.

Incidentally, in the foregoing description, the set speed $S_{S1}$ is 50 km/h and the set speed $S_{S2}$ is 45 km/h. However, these speeds are only examples, i.e., the invention is not limited to these speeds. For example, the minimum speed at which the supply air is blown by the ram pressure or a speed that is set according to the minimum speed may also be used.

In this way, when the coolant temperature Tw is equal to or less than the set temperature $T_{S3}$, the air-conditioner 10 is set to an engine warm-up promoting mode which promotes engine warm-up and suppresses a decrease in coolant temperature. This mode stops the blower fan 24 and enables the electric pump 50 to be stopped. Also, when the coolant temperature Tw is within the range from the set temperature $T_{S3}$ to the set temperature $T_{S1}$, the air-conditioner 10 is set to a low flowrate control mode which suppresses the flowrate of coolant and operates the electric pump 50 before operating the blower fan 24. When the coolant temperature Tw exceeds the set temperature $T_{S1}$, the air-conditioner 10 is set to a required flowrate control mode that requires a flowrate of the required flowrate Vr that keeps the speed of the electric pump 50 down based on the coolant temperature Tw and the blower air volume Va and the like. By setting the air-conditioner 10 to one of these modes depending on the conditions, air-conditioning is able to be performed efficiently while conserving energy when circulating coolant using the electric pump 50.

Incidentally, in the example embodiment described above, the electric pump 50 is controlled by the engine ECU 58. Alternatively, however, the electric pump 50 may also be controlled by the air-conditioner ECU 60 or by a controller that is provided separately as a cooling apparatus.

Also, the invention is not limited to the structure described in the foregoing example embodiments. That is, the invention may be applied to a vehicle having any one of various configurations that performs engine stop control, such as a hybrid vehicle, as well as to an air-conditioning system provided in a vehicle.

The invention claimed is:

1. A control method of an air-conditioning system for a vehicle that includes:
    an electric pump that circulates coolant at a flowrate according to a speed of the electric pump between an engine and a heater core; and
    an engine controlling device that controls starting/stopping of the electric pump, as well as the speed of the electric pump when the electric pump is being driven, based on a driving state of the engine, and driving the electric pump at a speed according to a required flowrate that is input when a flowrate is required; wherein
    the air-conditioning system performing air-conditioning by blowing supply air, which is produced by controlling an air-heating amount by the heater core through which the coolant is circulated, out into a vehicle cabin from an air outlet, the control method comprising:
    detecting a temperature of the coolant;
    controlling operation of a blower fan that is driven to produce the supply air;
    air-conditioning the vehicle cabin with supply air produced by controlling the amount of air heated by the heater core;
    stopping operation of the blower fan when the detected temperature of the coolant is equal to or less than a set temperature during heating;
    detecting a vehicle speed;
    determining whether vehicle speed exceeds a preset vehicle speed;
    setting the required flowrate of the coolant that is circulated to the heater core based on the detected vehicle speed when the blower fan is stopped because the temperature of the coolant has not reached the set temperature and when the vehicle speed exceeds the preset vehicle speed;
    setting the required flowrate of the coolant that is circulated to the heater core to 0 when the blower fan is stopped because the temperature of the coolant has not reached the set temperature and when the vehicle speed is equal to or less than the preset vehicle speed; and requiring the engine controlling device to circulate the coolant of the required flowrate when the required flowrate has been set.

2. An air-conditioning system provided for a vehicle that includes:
an electric pump that circulates coolant at a flowrate according to a speed of the electric pump between an engine and a heater core; and
an engine controlling device that controls starting/stopping of the electric pump, as well as the speed of the electric pump when the electric pump is being driven, based on a driving state of the engine, and drives the electric pump at a speed according to a required flowrate that is input when a flowrate is required;
the air-conditioning system performing air-conditioning by blowing supply air, which is produced by controlling an air-heating amount by the heater core through which the coolant is circulated, out into a vehicle cabin from an air outlet,
the air-conditioning system further comprising:
a blower fan that is driven to produce the supply air;
a coolant temperature detecting device that detects a temperature of the coolant;
an air-conditioning controlling device that:
controls operation of the blower fan and air-conditions the vehicle cabin with supply air produced by controlling the amount of air heated by the heater core, and stops operation of the blower fan when the temperature of the coolant detected by the coolant temperature detecting device is equal to or less than a set temperature during heating;
sets the required flowrate of the coolant that is circulated to the heater core; and
requires the engine controlling device to circulate the coolant of the required flowrate when the required flowrate has been set; and
a vehicle speed detecting device that detects a vehicle speed;
wherein the air-conditioning system is configured such that when the air-conditioning controlling device stops the blower fan because the temperature of the coolant is less than the set temperature an when the vehicle speed detecting device detects that the vehicle speed exceeds preset speed, the air-conditioning controlling device sets the required flowrate of the coolant based on the vehicle speed; and
wherein when the air-conditioning controlling device stops the blower fan because the temperature of the coolant is less than the set temperature and when the vehicle speed detecting device detects that the vehicle speed is equal to or less than the preset speed, the required flowrate is set to 0.

3. The vehicular air-conditioning system according to claim 2, further comprising:
a switching device that switches between an outside air inlet through which air outside the vehicle is introduced as the supply air, and an inside air inlet through which air inside the vehicle cabin is introduced as the supply air,
wherein the air-conditioning controlling device sets the required airflow when the switching device makes a switch such that outside air is introduced through the outside air inlet.

4. The vehicular air-conditioning system according to claim 3, wherein when the switching device makes a switch such that outside air is introduced through the outside air inlet, the air-conditioning controlling device sets a minimum flowrate within a preset required flowrate settable range as the required flowrate.

5. The vehicular air-conditioning system according to claim 2, further comprising:
a selecting device that selects, as an outlet for the supply air, a defroster outlet that points toward a window; and
an outside air temperature detecting device that detects an outside air temperature,
wherein when the defroster outlet is selected by the selecting device, the air-conditioning controlling device performs control such the supply air, which is produced by increasing the amount of air that passes through the heater core, is blown out from the defroster outlet;
wherein when the defroster outlet is selected by the selecting device and the outside air temperature detected by the outside air temperature detecting device is lower than a set temperature, the air-conditioning controlling device sets a maximum flowrate within a preset required flowrate settable range as the required flowrate; and
wherein when the defroster outlet is selected by the selecting device and the outside air temperature is greater than the set temperature, the air-conditioning controlling device sets a predetermined flowrate which is lower than the maximum flowrate as the required flowrate.

6. The vehicular air-conditioning system according to claim 2, wherein the air-conditioning controlling device stops the blower fan when the temperature of the coolant becomes lower than a first set temperature; the air-conditioning device drives the blower fan when the temperature of the coolant becomes higher than a second set temperature which is higher than the first set temperature; and the setting device sets the required flowrate when the temperature of the coolant exceeds the first set temperature.

7. The vehicular air-conditioning system according to claim 6, wherein when the temperature of the coolant exceeds the first set temperature, the air-conditioning controlling device sets a minimum flowrate within a preset required flowrate settable range as the required flowrate.

* * * * *